United States Patent [19]
Gorelick et al.

[11] Patent Number: 5,389,267
[45] Date of Patent: * Feb. 14, 1995

[54] IN-SITU VAPOR STRIPPING FOR REMOVING VOLATILE ORGANIC COMPOUNDS FROM GROUNDWATER

[75] Inventors: Steven M. Gorelick, San Carlos, Calif.; Haim Gvirtzman, Modi'im Mobile Post, Israel

[73] Assignee: The Board of Trustees of the Leland Stanford Junior University, Palo Alto, Calif.

[*] Notice: The portion of the term of this patent subsequent to Jan. 19, 2010 has been disclaimed.

[21] Appl. No.: 993,722

[22] Filed: Dec. 18, 1992

Related U.S. Application Data

[63] Continuation-in-part of Ser. No. 698,409, May 10, 1991, Pat. No. 5,180,503.

[51] Int. Cl.⁶ .................................................. C02F 1/20
[52] U.S. Cl. ..................................... 210/758; 210/170; 210/765; 210/806
[58] Field of Search ............... 210/758, 170, 765, 806, 210/901, 767, 188, 805, 205; 166/266; 203/10

[56] References Cited

U.S. PATENT DOCUMENTS

| | | | |
|---|---|---|---|
| Re. 33,102 | 10/1989 | Visser et al. | 166/267 |
| 4,435,292 | 3/1984 | Kirk et al. | 210/747 |
| 4,593,760 | 6/1986 | Visser et al. | 166/267 |
| 4,832,122 | 5/1989 | Corey et al. | 166/266 |
| 4,886,119 | 12/1989 | Bernhardt et al. | 166/242 |
| 4,892,688 | 1/1990 | Bernhardt | 261/24 |
| 4,943,305 | 7/1990 | Bernhardt | 55/170 |
| 4,950,394 | 8/1990 | Bernhardt et al. | 210/170 |
| 4,992,174 | 2/1991 | Caplan et al. | 210/610 |
| 5,017,289 | 5/1991 | Ely et al. | 210/610 |
| 5,143,606 | 9/1992 | Bernhardt | 210/170 |
| 5,172,764 | 12/1992 | Hajali et al. | 166/267 |
| 5,180,503 | 1/1993 | Gorelick et al. | 210/758 |

FOREIGN PATENT DOCUMENTS

| | | |
|---|---|---|
| 3811962 | 2/1988 | Germany. |
| 3805200 | 9/1988 | Germany. |

OTHER PUBLICATIONS

"Examination of venting for removal of gasoline vapors from contaminated soil," prepared by Texas Research Institute, Inc., for the American Petroleum Institute, Mar. 1980 (reprinted in *Groundwater Research*, 1986).

"In-situ remediation of volatile contaminants in groundwater by a new system of Underpressure-Vaporizer-Wells", Herrling, B., et al., Proceedings of the Conference of Subsurface Contamination by Immiscible Fluids, Calgary, Apr. 1990.

"Control of Volatile Organic Chemicals in Groundwater by In-Well Aeration", J. A. Coyle, et al., Proceedings, American Water Works Assn. Annual Conference, Washington, D.C., Jun., 1985.

*Primary Examiner*—Frank Spear
*Attorney, Agent, or Firm*—Heller, Ehrman, White & McAuliffe

[57] ABSTRACT

An in-situ system for removing volatile organic compounds (VOCs) from groundwater. The technique includes gas-lift pumping and in-situ vapor stripping.

38 Claims, 11 Drawing Sheets

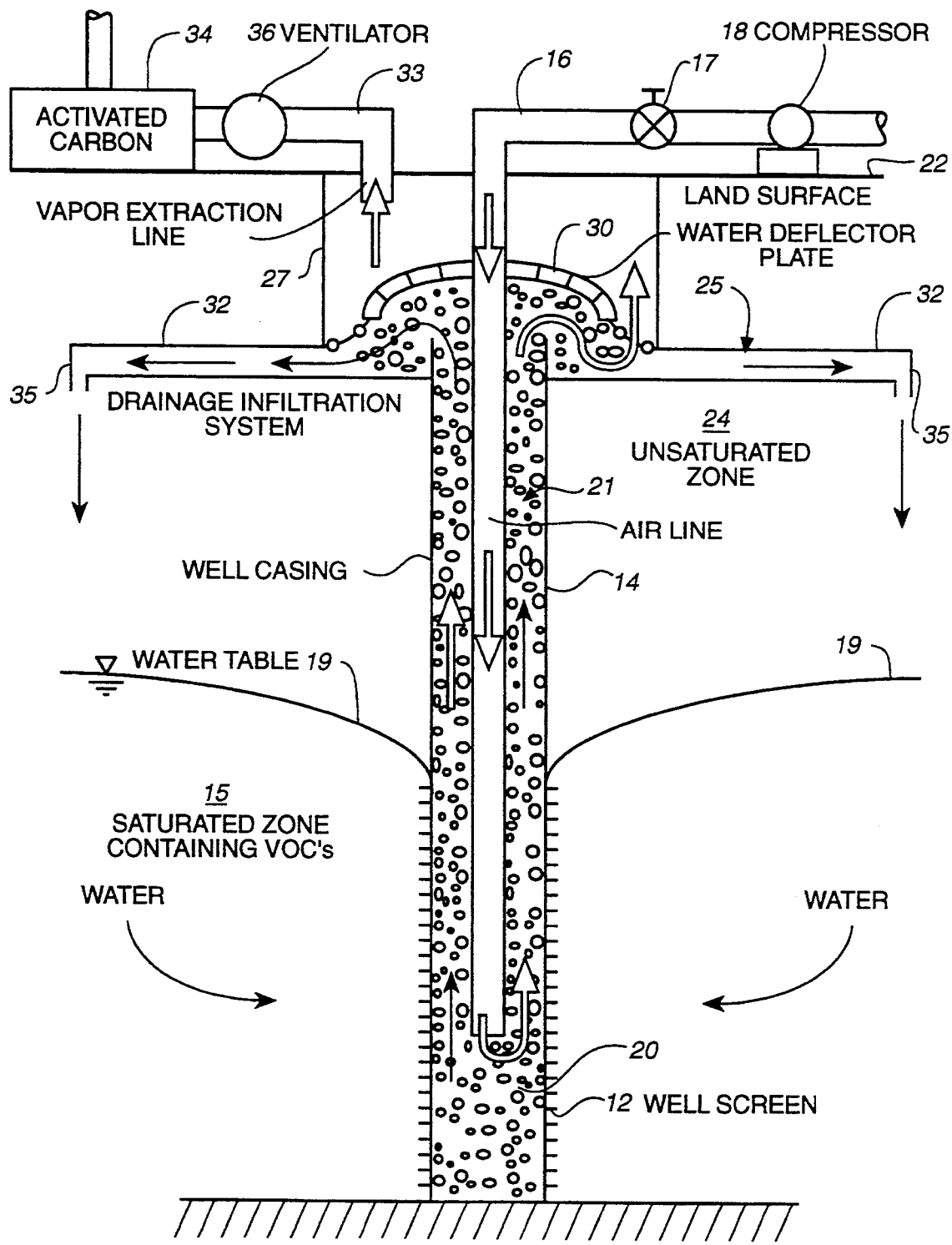
FIG._1

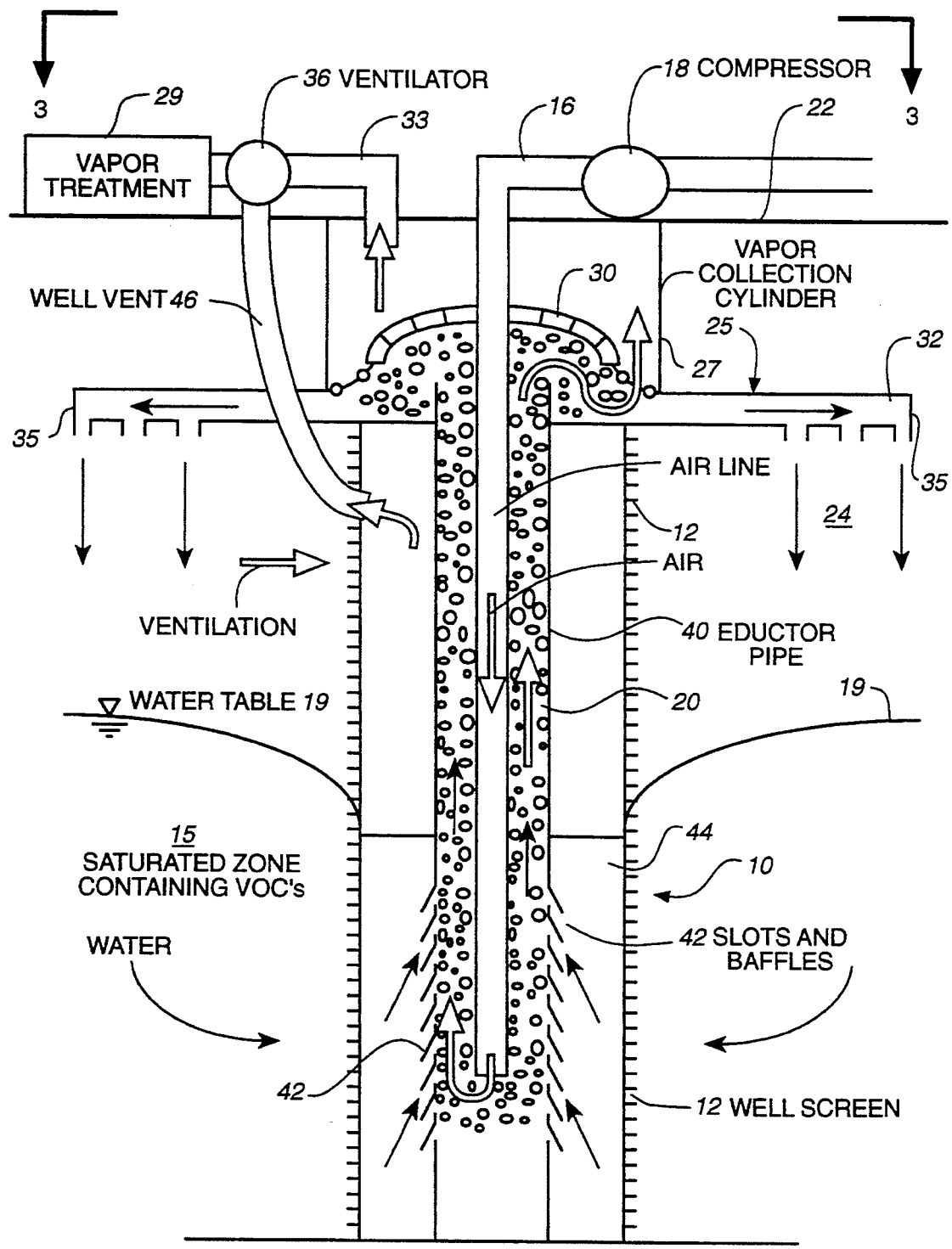
*FIG._2*

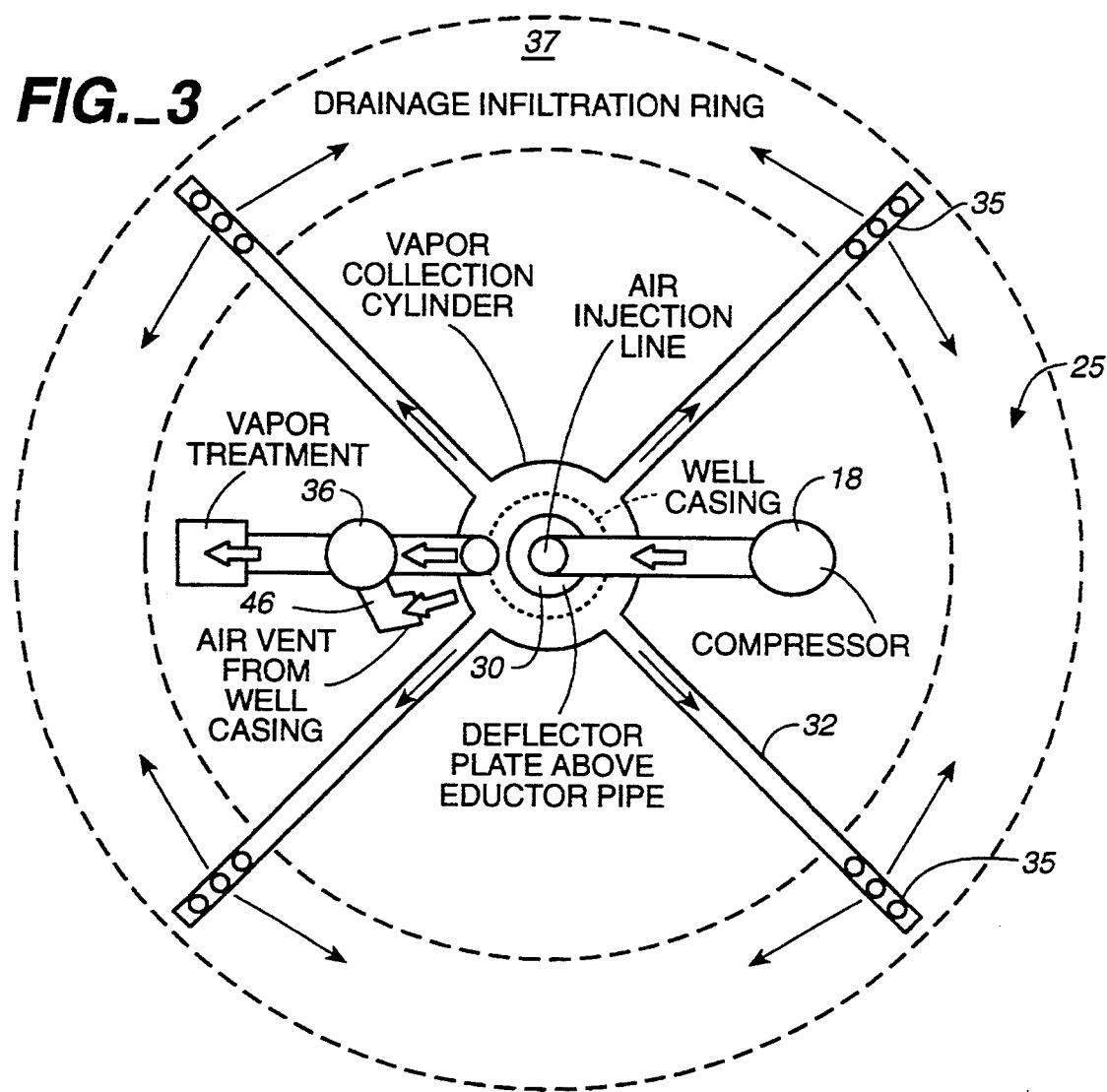
FIG._3
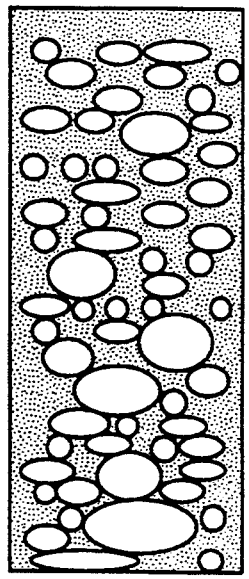
FIG._4A
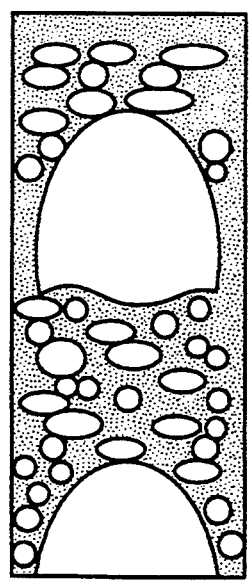
FIG._4B

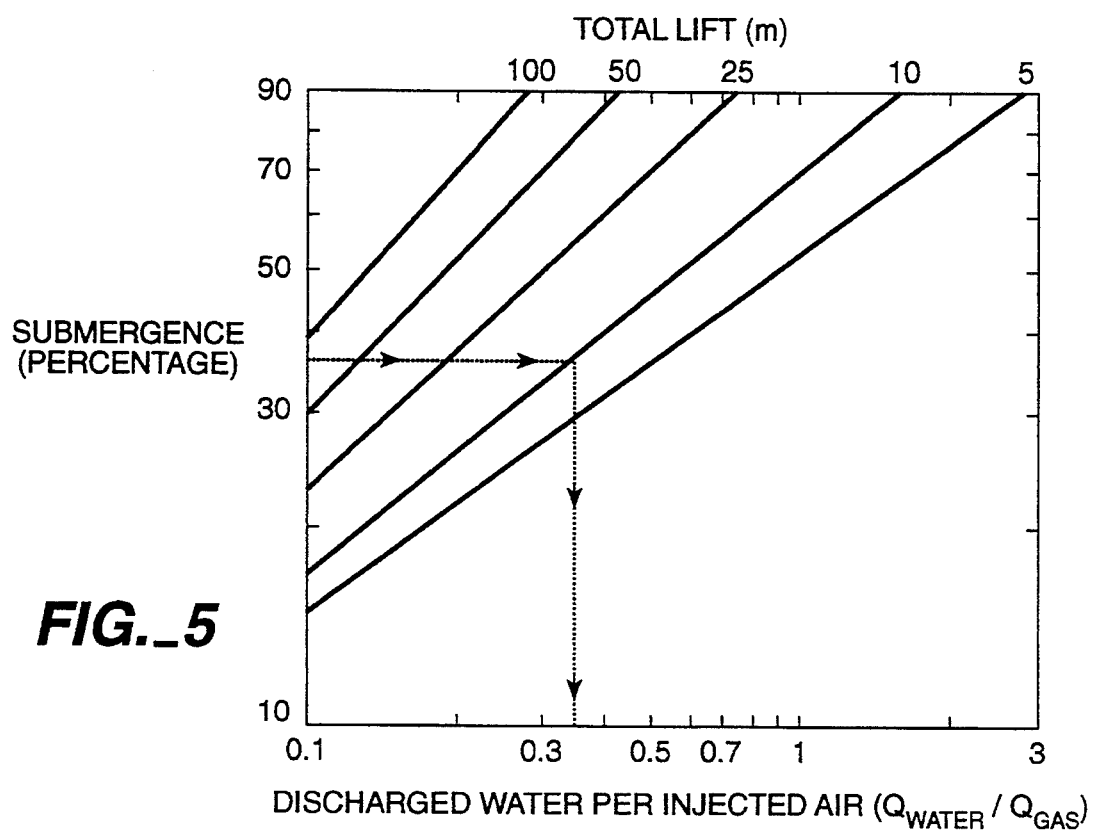
FIG._5
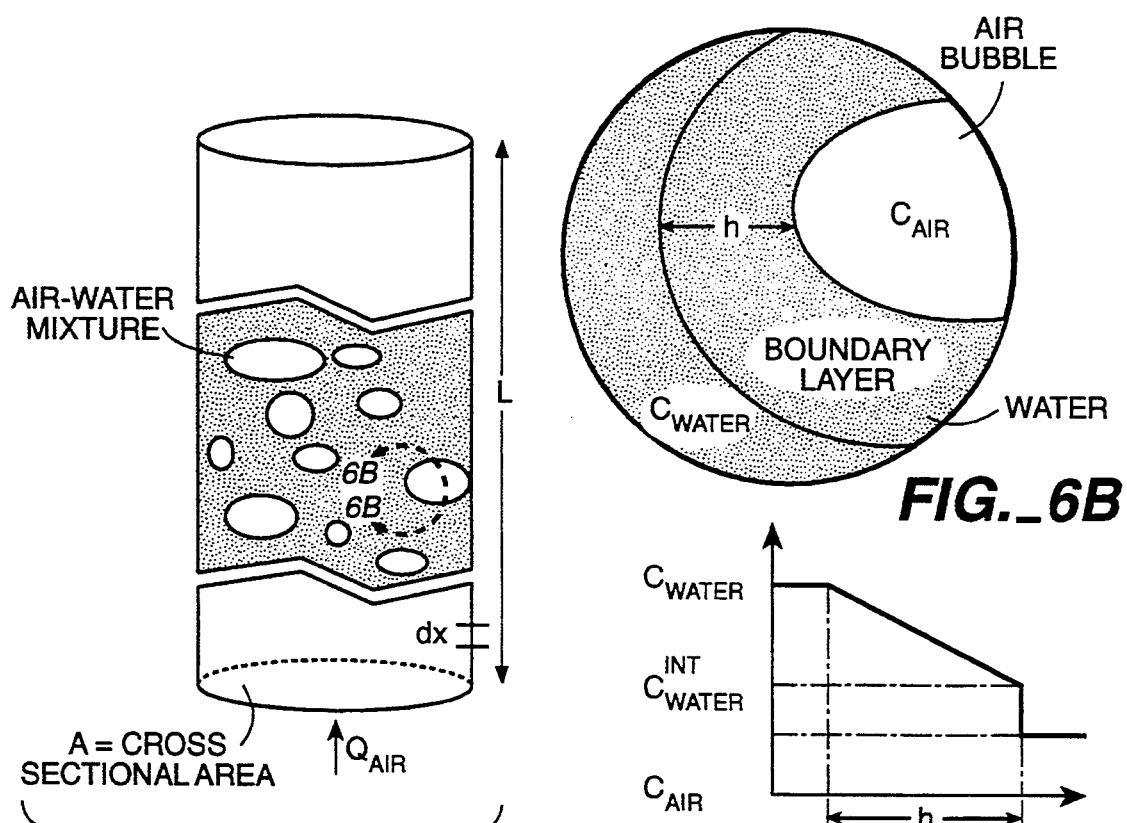
FIG._6A
FIG._6B
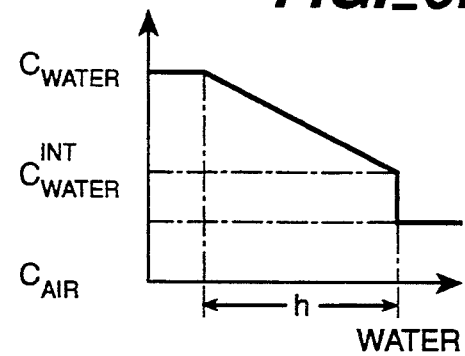
FIG._6C

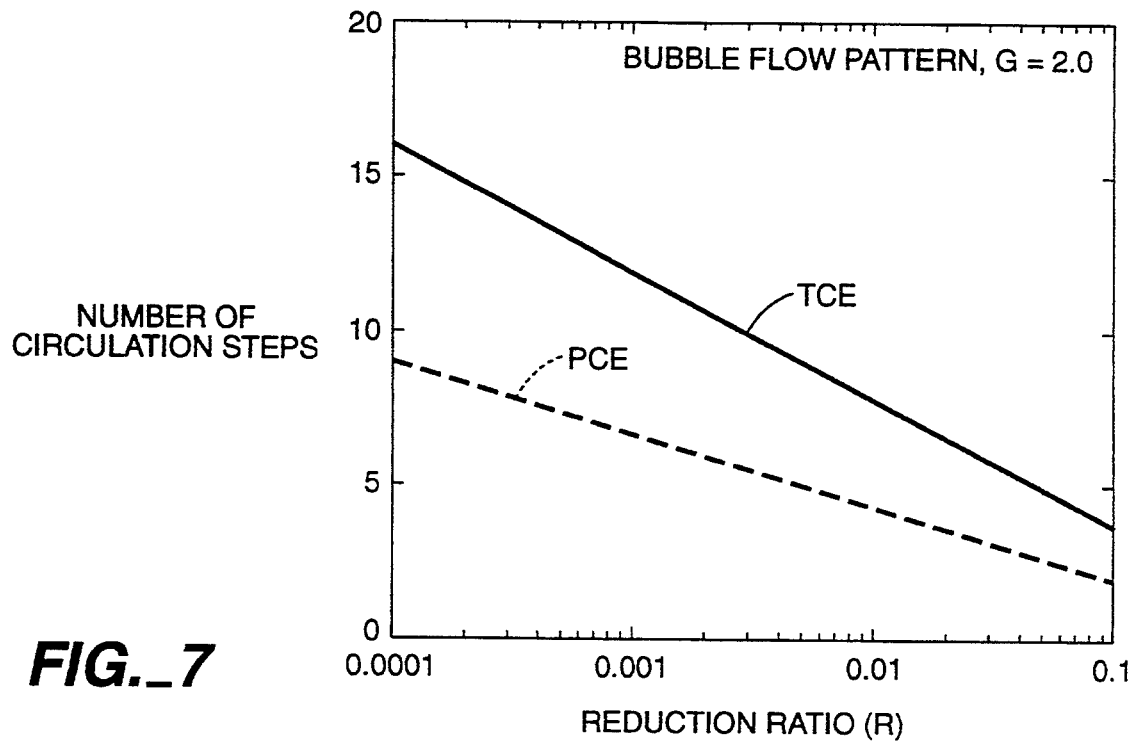
FIG._7
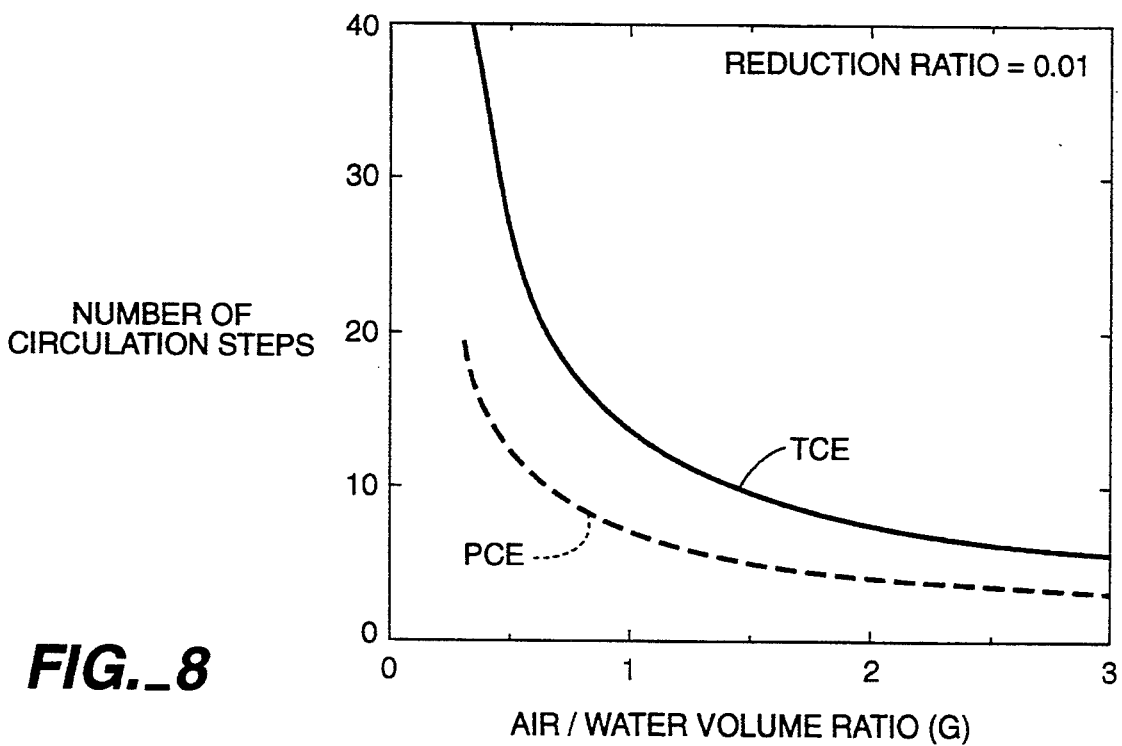
FIG._8

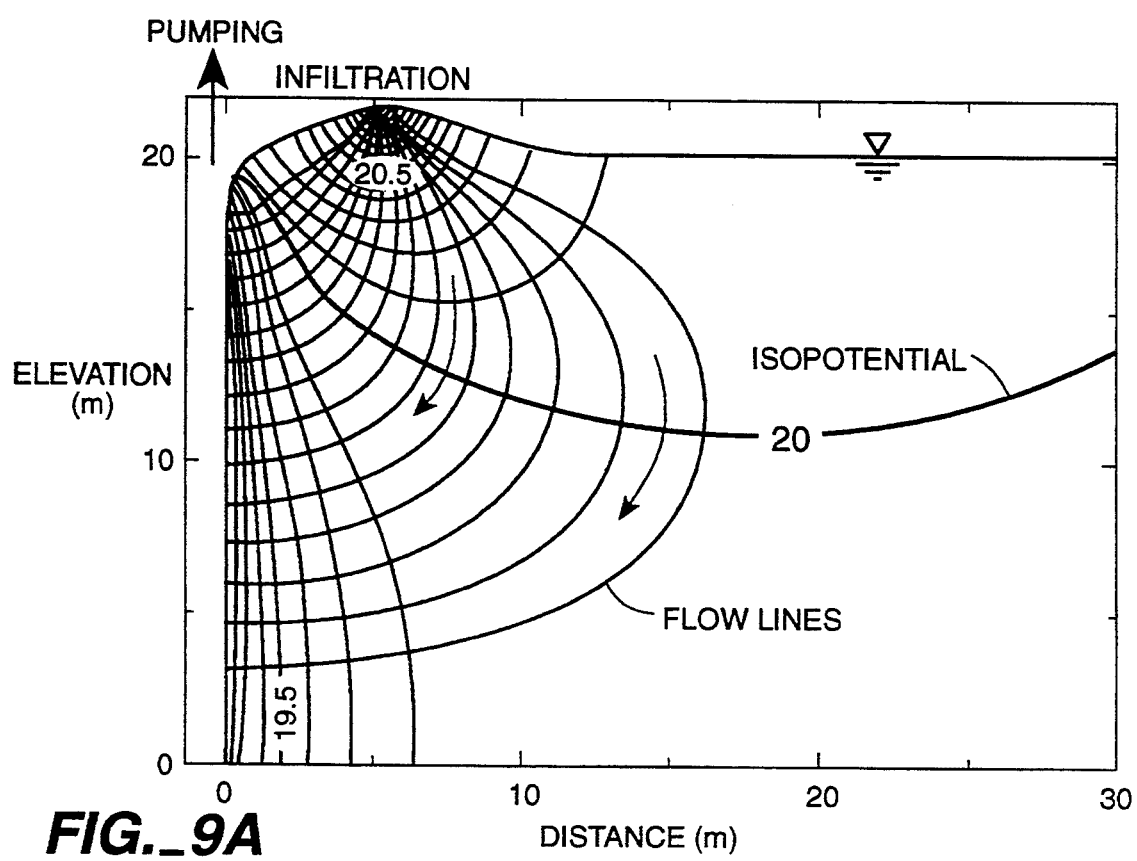
FIG._9A
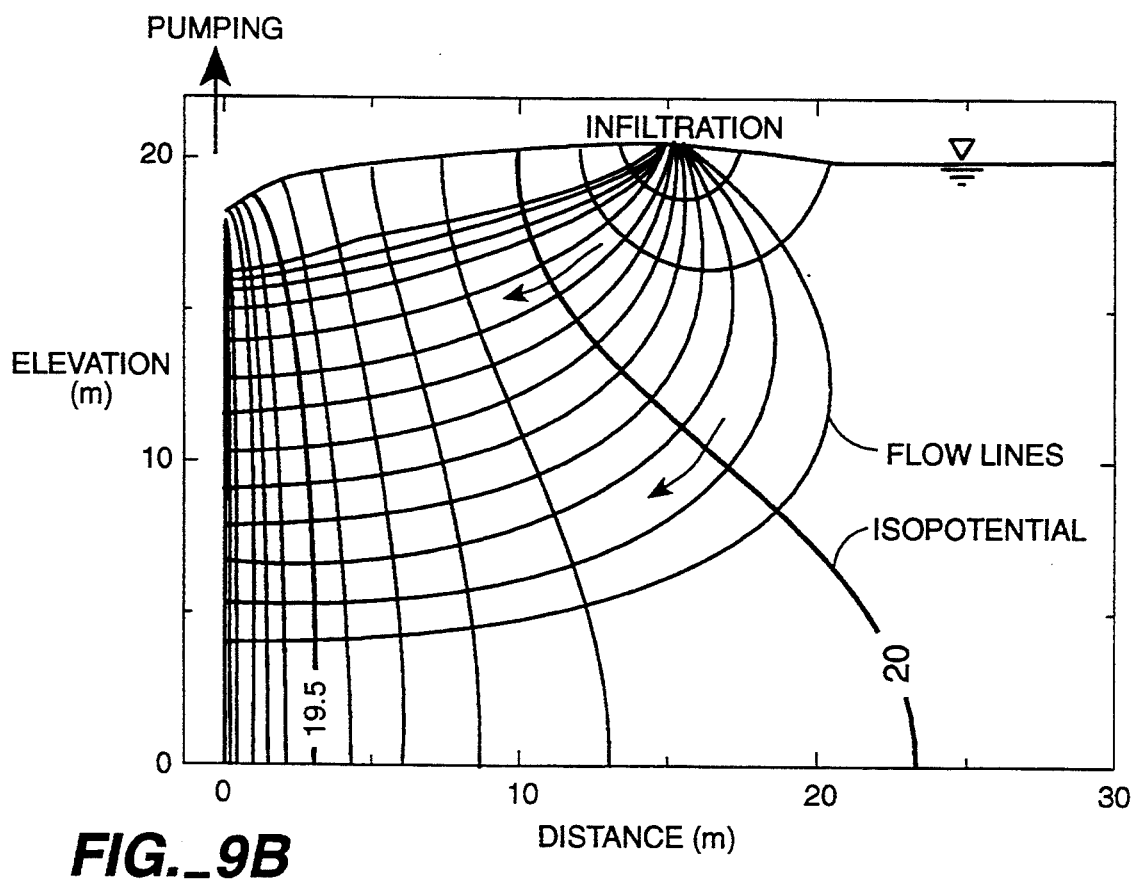
FIG._9B

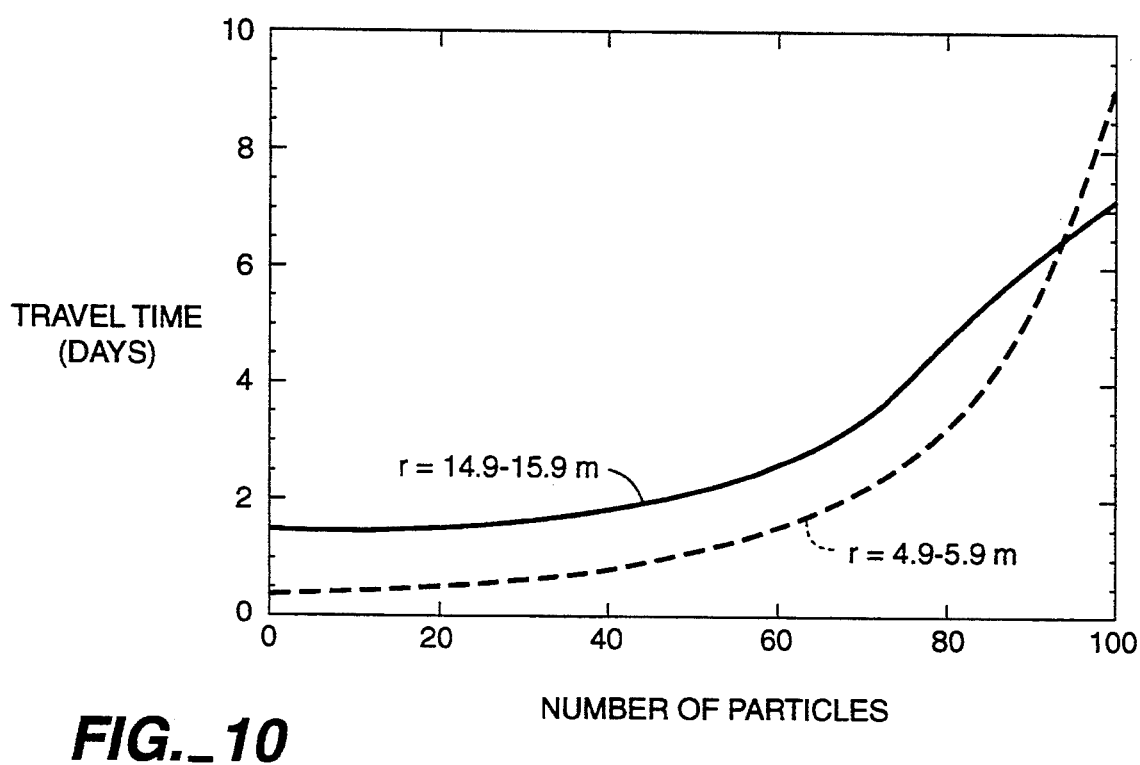
FIG._10

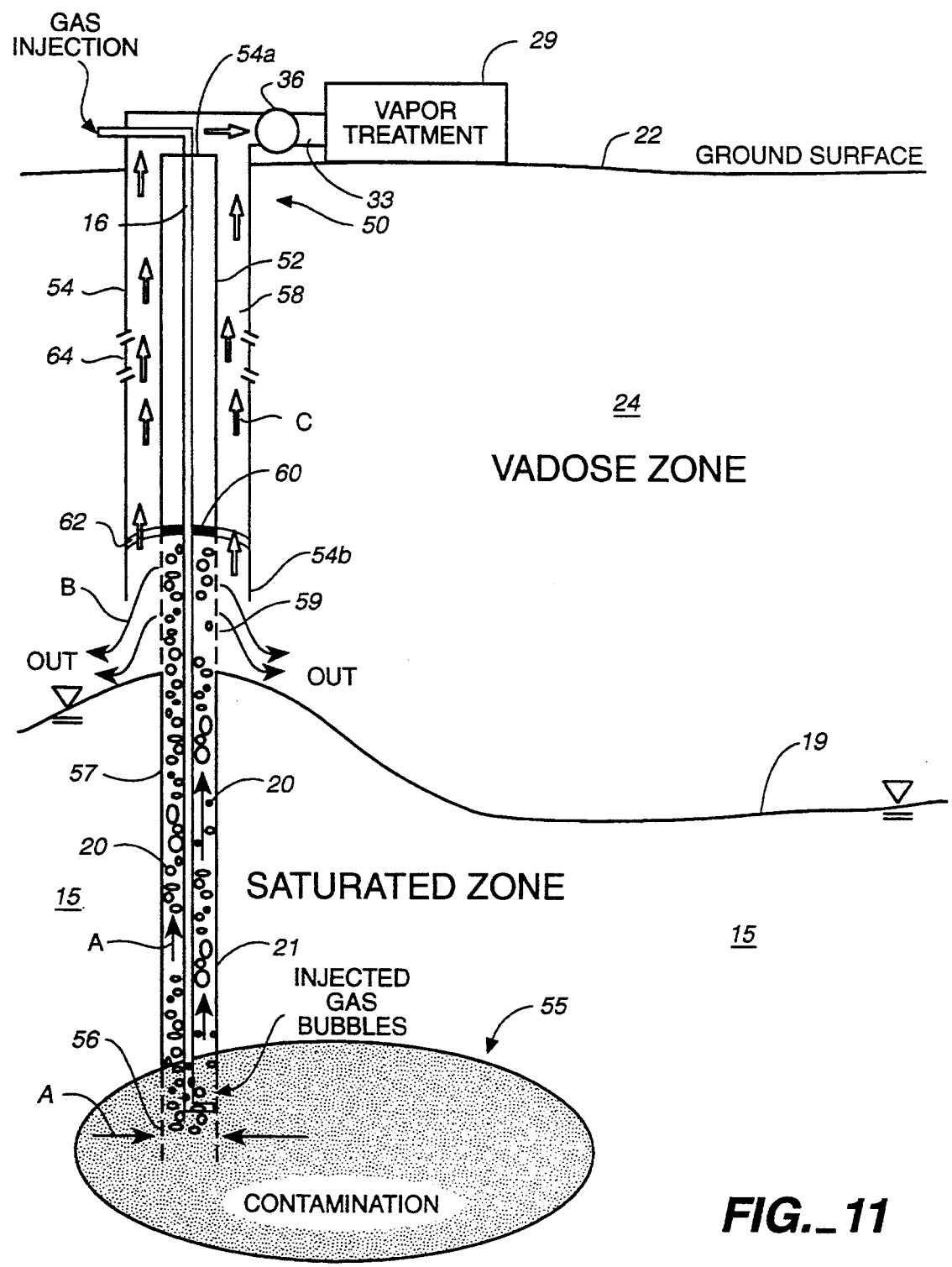
FIG._11

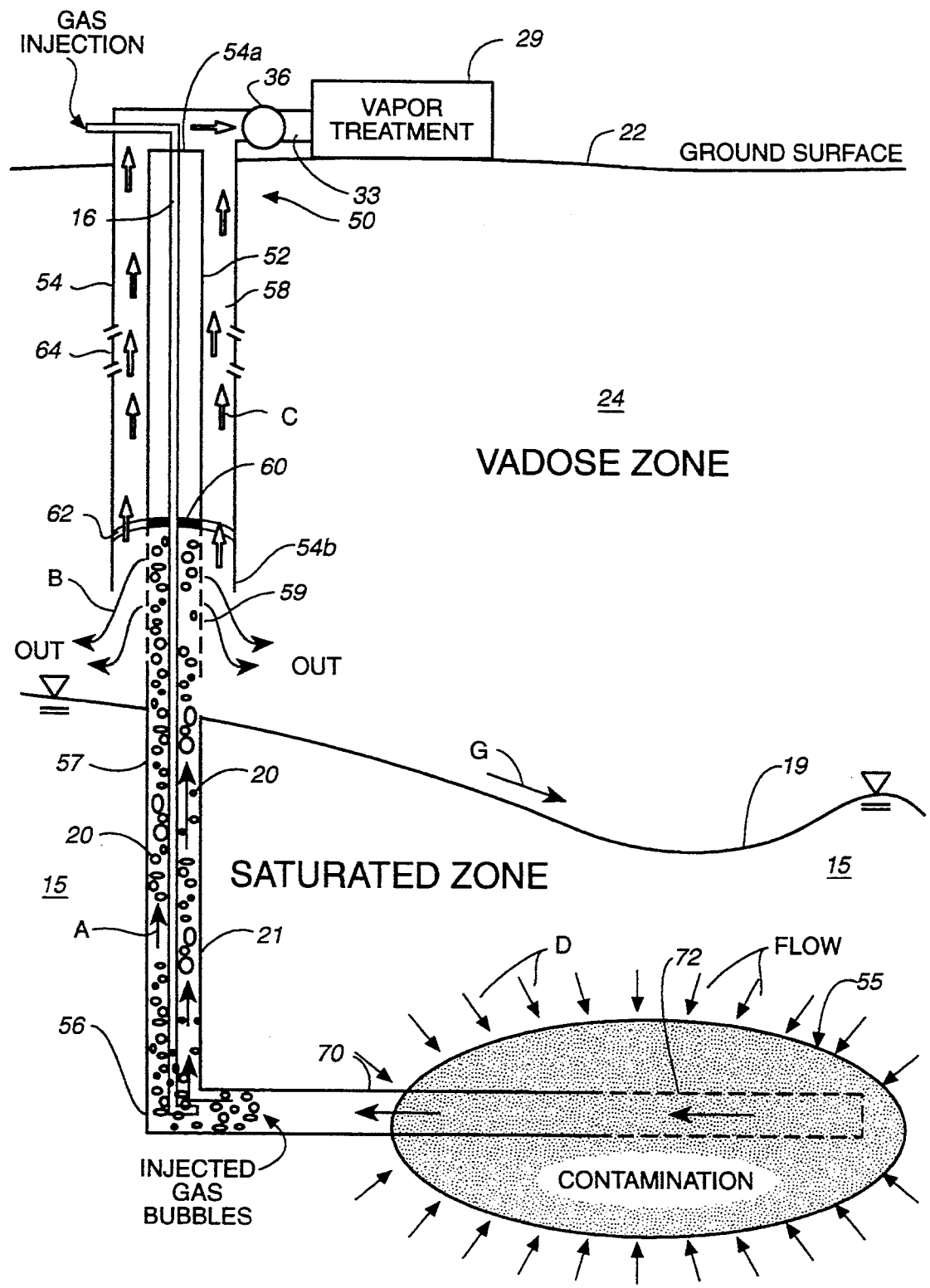
FIG._12

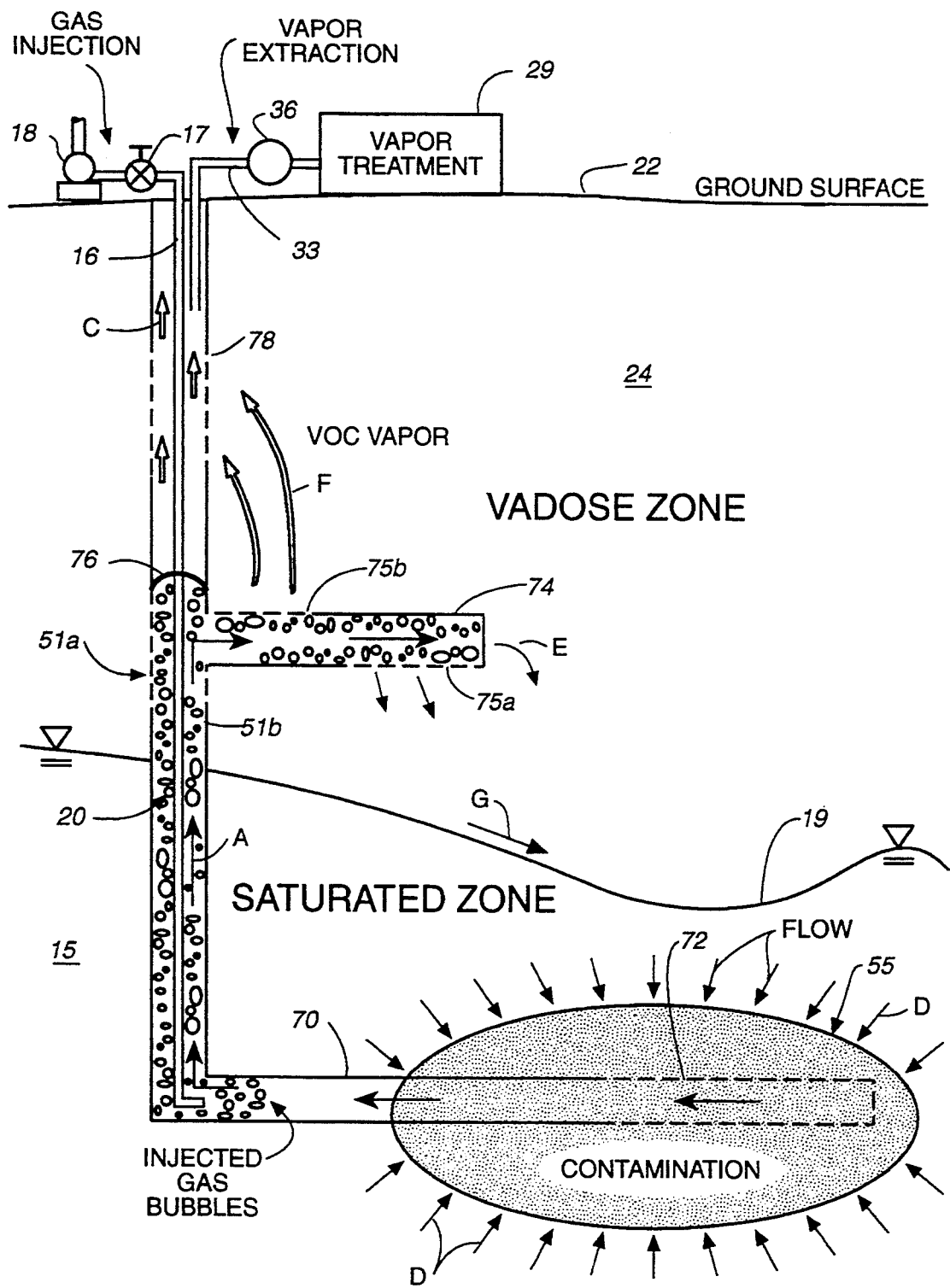
FIG._13

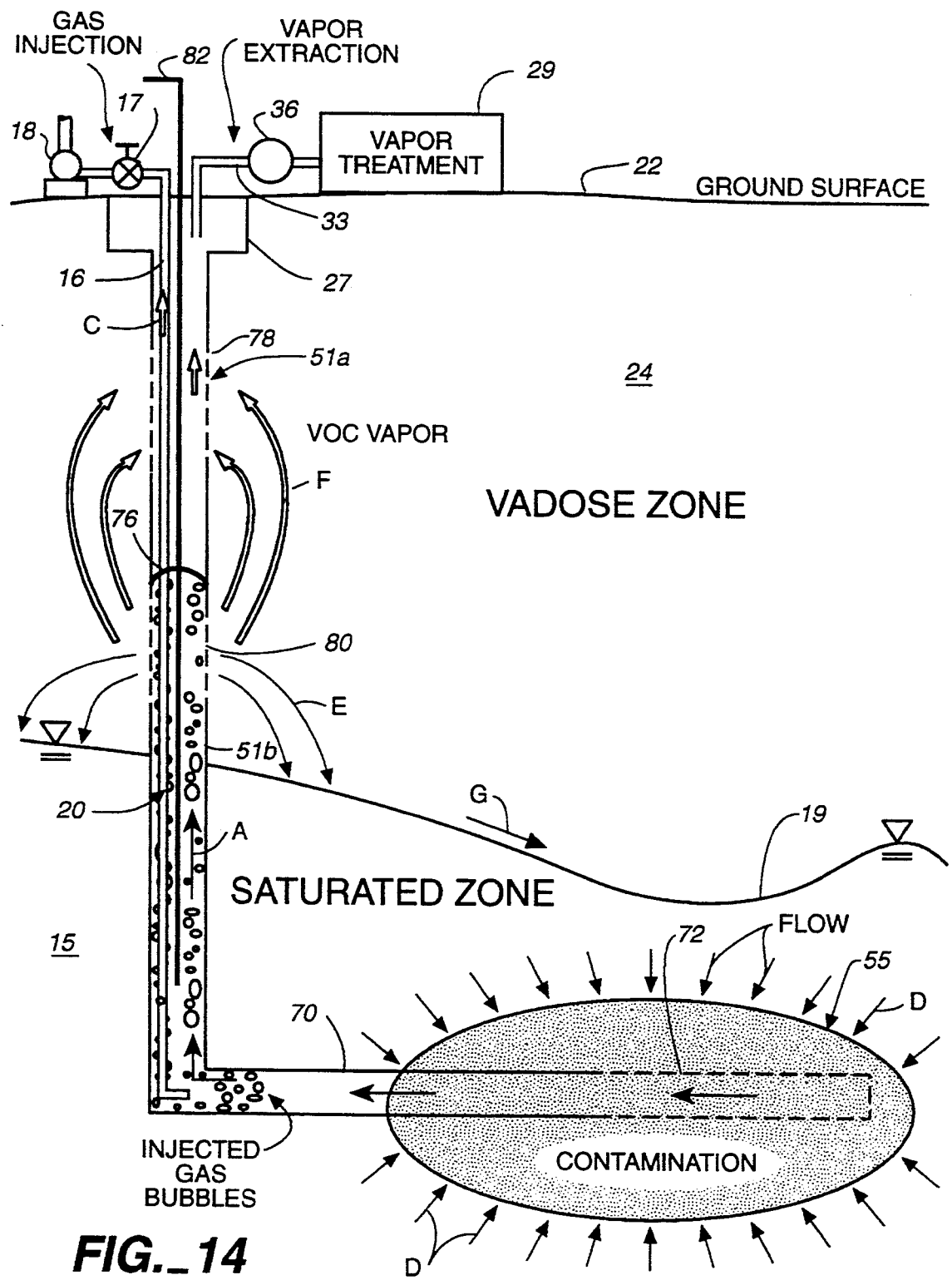
FIG._14

IN-SITU VAPOR STRIPPING FOR REMOVING VOLATILE ORGANIC COMPOUNDS FROM GROUNDWATER

The present application is a continuation-in-part of application Ser. No. 07/698,409, filed May 10, 1991, now U.S. Pat. No. 5,180,503.

BACKGROUND OF THE INVENTION

The present invention relates generally to procedures for cleaning contaminated groundwater, and more particularly to in-situ procedures for removing volatile organic compounds (VOCs) from groundwater.

During the last decade, over 1200 hazardous waste sites in the U.S. have been placed on the EPA National Priorities List for remedial investigation and cleanup. However, current remediation methods are often very expensive, and alternative concepts and techniques are needed. The present invention is particularly concerned with VOCs which pose a significant threat to groundwater supplies and are commonly detected in groundwater.

The most common class of VOC pollutants are petroleum products, such as gasoline and jet fuels. The U.S. EPA estimates that there are more than 2 million underground tanks in the United States and that 20 percent of them leak and contaminate groundwater. Such tanks leak benzene, toluene and their derivatives which become dissolved in groundwater. Another important group of VOC pollutants is chlorinated hydrocarbons, notably TCE (trichloroethylene, $CHCl=CCl_2$) and its degradation products.

One challenge for hydrologists and environmental engineers is to develop new in-situ remediation methods for removing the dissolved organic contaminants in a simple, cheap and efficient manner. At many contaminated sites, it is common for the majority of the organic pollutants to exist as separate liquid phases. A portion may dissolve into groundwater or may evaporate into the gas phase in the unsaturated zone. Once in the groundwater, the dissolved organic contaminants are transported as plumes. During aquifer remediation, the main body of organic liquid is usually removed from groundwater by skimming or pumping with subsequent above ground treatment. A portion of the liquid phase that is retained by capillary forces may continue to slowly dissolve. Remedial action may also include forced vacuum extraction through the unsaturated zone to remove the gas phase of the toxic substances. Unfortunately, the dissolved portion is not treated in-situ, because remediation technologies are limited to 'pump-and-treat' (i.e., above ground) methods.

The newly-developed method of biorestoration may provide an alternative for some specific cases. This method is aimed at enhancing biodegradation of organic compounds through the introduction or stimulation of natural microorganisms along with injection of nutrients and oxygen. Lately, methanogenic microorganisms have been discovered in natural systems that are able to co-metabolize TCE under reducing conditions after controlled stimulation. Although in the early phase of technology development, these methods may become practical and effective. However, these methods are limited to very specific conditions; for example, in-situ bioremediation of TCE-containing water is apparently limited to fluids containing less than about 100 ppm of TCE, as higher concentrations seem to be toxic. Alternatively, an in-situ remediation technique using an under-pressure vaporizer floating device was introduced.

Apparently, an in-situ aquifer remediation method that employs air-lift pumping as a means of producing gas bubbles to remove VOCs from groundwater is not mentioned in the literature. Related studies have inspected the effects of air bubbles on various hydrologic, geologic, and engineering processes. The general behavior of air bubbles in groundwater is mentioned in the hydrological literature in relation to its effect on decreasing hydraulic conductivity, its effect on soil moisture hysteresis and its effect on water table fluctuations. It has been suggested that air bubbles might serve as carriers of suspended particles such as clay minerals in porous media, due to their special interface properties. In the petroleum engineering literature, the behavior of gas bubbles is mentioned by researchers regarding their effect on oil reservoirs. Transport by gas bubbles in the free liquid phase has received attention in fields as diverse as oceanography, where bubbles are mentioned as important carriers of organic matter to the sea surface, and in flotation techniques for the processing of ores.

Air-liquid mass exchange has been applied in two different processes. First is "gas stripping" of industrial wastewater using large towers above the ground; and second, the purge and trap laboratory technique for analysis of concentrations of trace volatile chemicals. This water-gas phase mass transfer is very efficient. In the case of gas stripping it is possible to reduce concentrations in the aqueous phase to the water quality standards which are frequently at the detection limit. It is interesting to note that today gas stripping is used as a standard method for removing volatile chemicals from pumped groundwater in contaminated sites before its supply for domestic usage. The purge-and-trap method in the laboratory is also an effective removal method for many compounds.

The present invention involves a new concept for in-situ removal of dissolved VOCs from the saturated zone. It avoids standard 'pump-and-treat' methods. It is a combined gas-lift pumping technique and in-situ vapor stripping method. The idea is to inject gas into wells which lifts the contaminated water in the well. During the process, VOCs are transferred from the water to the gas bubbles. The injected gas can be air or any specific gas such as nitrogen, carbon dioxide, or any other combination of gases. The injected gas can be at the ambient temperature or it can be warm or cold. The VOCs are then collected at the top of the well by vapor extraction.

An object of the present invention is to provide a simple, inexpensive and efficient technique for removing dissolved contaminants. That is, to use the gas-lift pumping and in-situ vapor stripping techniques for removing VOCs from ground water.

Additional objects and advantages of the invention will be set forth in the description which follows, and in part will be obvious from the description, or will be learned by practice of the invention. The objects and advantages of the invention may be realized and obtained by means of the instrumentalities and combinations particularly pointed out in the claims.

SUMMARY OF THE INVENTION

The present invention is directed to a system for removing VOCs from groundwater. The system includes means for injecting gas into a well, to force groundwater flow towards the well and to cause VOCs to be transferred from the groundwater to rising gas bubbles inside the well. The system further includes means for collecting VOC vapor contained within the gas bubbles.

The system may also include a substantially horizontal extraction member in the saturated zone extending toward a zone of contamination for introducing contaminated groundwater into the well. Additionally, the system may include an infiltration member in the vadose zone for infiltrating groundwater therein and removing VOCs from the well.

The in-situ remediation procedure of the present invention is accomplished by injection of gas into a well, using a combined technique of gas-lift pumping with a form of vapor stripping. When gas is injected into a well, it causes water to be lifted and forces groundwater flow towards the well, creating a recirculating cleanup zone. During this process, VOCs are transferred from the contaminated water to the rising gas bubbles inside the well. The gas containing VOC vapor is collected at the top of the well. In this system, water need not be lifted to the ground surface. Rather, the water is forced into the unsaturated zone through a series of drains that are installed beneath the root-zone. The water then, free of a portion of VOCs, infiltrates back to the water table. As water continues to circulate, the VOC concentrations are gradually reduced.

The feasibility of the technique of the present invention was analyzed according to concepts of mass transfer of VOCs from water to air-bubbles. Calculations indicate that the system has promise because equilibrium partitioning between the contaminated liquid and the air bubbles is rapidly established.

BRIEF DESCRIPTION OF THE DRAWINGS

The accompanying drawings, which are incorporated in and constitute a part of the specification, schematically illustrate a preferred embodiment of the invention and, together with the general description given above, and the detailed description of the preferred embodiment given below, serve to explain the principles of the invention.

FIG. 1 is a schematic structure of a well, installed with an air line and a drainage infiltration system, designated for aquifer remediation. [The remediation circulation cell will reach steady-state conditions during which: water (solid arrows) is lifted in the well, forced to the unsaturated zone, infiltrates to the water table, and flows back to well. Air (outlined arrows) is injected into the well, bubbles rise and become saturated with VOCs, and are collected at the top of the well.]

FIG. 2 shows a well design to prevent air from entering the aquifer using an eductor pipe with slots and baffles. Water flow is shown by solid arrows and air flow is shown by outlined arrows. As seen, when the well is screened above the water table, the annular space between the eductor pipe and the well casing can be connected to the ventilator. This enables ventilation of vapor from the vadose zone.

FIG. 3 is a plan view along line 3—3 of FIG. 2.

FIGS. 4A and 4B show flow patterns of water-air mixture in a vertical pipe: a "bubble flow pattern" where the air volume fraction is 67%, and a "slug flow pattern" (containing bullet-shaped bubbles) where the air-volume fraction is 70%, respectively.

FIG. 5 shows the volume ratio of discharged water per injected air vs. the submergence percentage for different values of required total lift. This graph assumes usage of 'standard' diameters of casing and airline and serves as a useful guide for particular field cases.

FIG. 6A, 6B and 6C show a water-air bubble mixture flowing in a pipe, demonstrating the VOC mass transfer model across the liquid boundary layer (its thickness designated by 'h').

FIG. 7 is a graph showing the required number of circulation steps vs. the reduction ratio for TCE and PCE for bubble flow pattern (G=2.0).

FIG. 8 is a graph showing the required number of circulation steps vs. the air/water volume ratio for TCE and PCE for a reduction ratio of 0.01.

FIGS. 9a and 9b are cross-sections showing the hydraulic head distribution and flow paths for radial flow systems with reinfiltration at 5 m and 15 m, respectively, from the well.

FIG. 10 shows travel times for 100 particles released 0.25 m beneath the water table for the radial flow systems with reinfiltration at distances of 5 m and 15 m from the air-injection well.

FIG. 11 schematically illustrates another embodiment of the present invention.

FIG. 12 schematically illustrates an embodiment of the present invention including a horizontal extraction member.

FIG. 13 schematically illustrates an embodiment of the present invention incorporating extraction and infiltration members.

FIG. 14 shows an alternate arrangement of FIG. 13.

DESCRIPTION OF THE PREFERRED EMBODIMENTS

The present invention will be described in terms of a number of preferred embodiments. The preferred embodiments include an in-situ remediation procedure for removing VOCs from groundwater.

As shown in FIG. 1, this is accomplished by injection of air into a well 10, using a combined technique of air-lift pumping with a form of vapor stripping. When air is injected into a well, it causes water to be lifted and forces groundwater flow towards the well, creating a recirculating cleanup zone. During this process, VOCs are transferred from the contaminated water to the rising air bubbles inside the well. The VOC vapor is collected at the top of the well. In this system, water is not permitted to be lifted to the ground surface. Alternatively, water may be lifted above the ground surface. In either case, the water is then forced into the unsaturated zone through a series of drains that are installed beneath the root-zone. The water, free of a portion of VOCs, then infiltrates back to the water table. As water continues to circulate, the VOC concentrations are gradually reduced.

The feasibility of the proposed method was analyzed according to concepts of mass transfer of VOCs from water to air-bubbles. Calculations indicate that the method has promise because equilibrium partitioning between the contaminated liquid and the air bubbles is rapidly established. That is, after 3 m of in-well flow for a "bubble flow pattern", equilibrium occurs The in-situ vapor stripping method involves a combination of various technologies. As illustrated by FIG. 1, a well 10 is screened fully or partially by a well screen casing 12 in the saturated zone 15, to allow contaminated water flow into the well. The well is cased by a solid casing 14 elsewhere. Inside the well casing, an air line 16 is introduced into which air is injected by a compressor 18. As previously noted, a gas other than air may be used as appropriate. A valve 17 controls the air flow in line 16. The rate of air injection can be adjusted to create substantial groundwater circulation toward the well and to control the rate of in-situ volatilization of VOCs. Mass exchange rates are approximated for VOC movement between the liquid and gas phases.

The air in air line 16 is released beneath the water table 19, creating bubbles that rise. Due to the density difference between the water column outside the well 10 and the water-bubble mixture column 20 inside the well, a lift is created. In other words, water rises up the well and water inside the aquifer flows towards the well. The water and air-bubble mixture 20 flows upward in the annular space 21 around the air line. In this system, water is not permitted to be lifted to the ground surface 22, thereby reducing costs and protecting the biotic environment above the root zone. Rather, the water is forced into the unsaturated zone 24 through a series of drains, represented generally by reference numeral 25, that are installed beneath the ground/land surface 22 in the unsaturated zone. These drains emanate horizontally from the well and their purpose is to return the air-lifted water to the aquifer by allowing the water to infiltrate through the unsaturated zone 24 (see also FIG. 3). In this way, a water circulation cell is created in the vicinity of the well. The drains, as discussed in more detail below, may comprise a series of buried pipes 32.

Simultaneously, an air-stripping 'chamber' is created within the well-casing. During the period in which the air bubbles flow through the water in the well, VOCs are transferred from the water to the gas phase. The effectiveness of vapor stripping will be based on the concentration gradient, the time span available for mass exchange, and the interface area of the air bubbles. The VOC vapor is collected using a vapor extraction technique at the top of the well. To enable collection of VOC vapor in the well, the air must be separated from the water. This can be accomplished using a simple deflection plate 30 (FIG. 1) that enables the bubbles to be released and the vapor containing VOCs to be collected through the vapor extraction line 33. As shown, the vapor extraction line extends into a vapor collection cylinder 27 (See also FIGS. 2-3). The vapor collection cylinder may be formed to prevent VOC vapors from being released into unsaturated zone 24. As such, and as illustrated, the vapor collection cylinder may be a cased well of larger diameter than well 10 from which drains 32 emanate. These drains form outlets in the vapor collection cylinder for the return of air-lifted water to unsaturated zone 24. The vapor collection cylinder is sealed at the top except for the openings for lines 16 and 33. As discussed, the VOC vapor may be removed via line 33.

The means used to separate the gas from the water can be accomplished, for example, using various designs of deflector plates, stacked porous plates, or a gravel pack. The organic rich vapor can be run through activated carbon 34 for removal, and a ventilator 36 is connected across line 33 to allow for vapor extraction. The removal of VOC vapor can be accomplished through a variety of processes including adsorption, biological treatment, chemical treatment, incineration, or atmospheric venting and dilution.

An air-venting 'chamber' is created in the unsaturated zone 24 while water infiltrates back to the water table. During this stage, the VOCs continue to be released into the soil. Soil gas venting can be used to remove the VOCs from the unsaturated zone. Because the pumped water drains continuously to the water table, the unsaturated zone can be used as a natural "vapor-stripping tower". As this process continues, water circulates from the aquifer to the well and then back to the water table. The concentration of VOCs is reduced, and after a sufficient number of circulation cycles, they will reach the permitted concentration standards.

For cases in which there is concern that air injection will force bubbles into the aquifer, a modified design is possible as shown in FIG. 2. An eductor pipe 40 can be installed between the air-line 16 and the well casing 12, creating a well-within-a-well. Then air injected into the air-line would be contained within this "inner well". Water and air would rise towards the ground surface 22 within the eductor pipe, forcing additional water to flow from the aquifer into the eductor pipe. Furthermore, the eductor pipe may be slotted and baffled at the lower end thereof, as represented by slots and baffles 42, to prevent gas bubbles from escaping horizontally. With this modification, it is nearly impossible for air bubbles to enter the aquifer because the bubbles are fully contained within the eductor pipe.

Furthermore, the well casing 12 can be screened, as shown, or partially screened in the vadose zone 24. The annular space 44 between the well casing and the eductor pipe can be vented through a well-vent tube 46. This enables vapor containing VOCs in the vadose zone to be extracted and treated through the same vapor treatment system 29 that is used to treat the VOCs removed from groundwater. As noted, the vapor treatment system may involve adsorption, biological treatment, chemical treatment, or incineration. A plan view of this system is shown in FIG. 3.

The vertical flow pattern of gas-liquid mixtures is a function of both the air and water velocities in the pipe. Two flow patterns, bubble and slug, which occur at successively higher air rates, are relevant to the present method, and are shown in FIGS. 4A and 4B. At a low air velocity, the gas is dispersed as discrete bubbles some of which may increase in size by coalescence. When bubbles are generated continuously, a pseudo-equilibrium condition is achieved where the size, shape and number per unit volume become relatively stable and are no longer affected by coalescence. This is the "bubble pattern" flow of FIG. 4B. With an increase in gas flow, some of the bubbles coalesce to form larger cap-shaped bubbles nearly spanning the tube. This marks the beginning of the "slug pattern" flow of FIG. 4B. The transition from a bubble (FIG. 4A) to a slug flow pattern (FIG. 4B) usually occurs when the volume fraction of the gas phase is between 0.25–0.70, and depends on the velocities of both phases. As the air rate is further increased, these bubbles become larger and each assume a bullet shape. The slug flow pattern is characterized by bullet-shaped bubbles surrounded by a thin water annulus alternating with slugs of water containing small bubbles. A further increase in air rate, beyond that of interest here, will create a continuous air phase.

The variation in bubble radius during its life is controlled by the competition between the tendency to increase due to constantly reducing hydrostatic pressure while ascending, and the tendency to decrease due to dissolution of the air in the water. For small bubbles, the variations in the bubble radii are controlled by the gas dissolution into liquid, and thus they tend to dissolve and disappear. In contrast, large bubbles tend to grow. The limiting bubble radius separating these two opposite possibilities is a function of the water depth. It is about 100 μm for a 10 m depth and about 300 μm for a depth of 100 m.

When a single bubble is released from an orifice in a stagnant liquid, a distance of only a few bubble radii is needed to reach a constant velocity. The terminal velocity occurs when buoyancy forces are balanced by viscous forces. The ascent velocity of a single bubble in a free and stationary liquid phase is a function of the bubble radius and the water viscosity, and cannot exceed 30 cm/sec.

Obviously, adjacent bubbles influence each other. Below a certain minimum separation distance, oscillation, spiraling and random motion could cause collision, adherence or coalescence. Furthermore, the vortex disturbance created by a rising bubble slows the rise of the trailing bubble. In fact, it was found that the velocity of a continuous swarm of bubbles in a stagnant liquid is significantly less than that of a single bubble.

When a swarm of bubbles rises with a vertically or inclined flowing stream of water, the mutual influence of the two flowing phases has to be considered. During vertical flow of a liquid-gas mixture in a pipe there is a "holdup" effect, also known as the "slip" effect. That is, the gas tends to flow at a higher average velocity than does the liquid. It has been found that the absolute rise velocity of bubbles in rising water will be a simple vector sum of the bubble velocity in a stagnant liquid and the local absolute velocity of the flowing liquid. There are some difficulties in applying the vector-sum concept to determine the average absolute rise velocity of bubbles in a flowing liquid because of nonuniformities in velocities, the variability in bubble concentration, and the liquid velocity distributions across the pipe. For present purposes, the difficulty in calculating the water and air velocity arises from the unstable flow pattern of the liquid-gas mixture, and the complex phase geometry inside the annular space. Consequently, air and water ascent velocities must be predicted based on empirical relations.

The technique of pumping groundwater by injecting air into a well is an accepted method of well development. It is also used as a method for petroleum extraction. The method is well understood in theory and practice for the purpose of water well development and petroleum recovery, but has not been used as a combined pumping and vapor-stripping method to remove VOCs in-situ as in the present invention.

Given an initial static water level, the compressor 18 used for air injection must overcome the initial water head dictated by the submergence depth of the air line 16 (FIG. 1). This head is called the starting submergence. When injection of air starts, the water column becomes partly aerated, causing water in the well to rise, followed by drawdown in the aquifer due to flow into the well. Given sufficient time, a steady-state condition will be developed with a constant flow rate and a steady drawdown. This defines the final pumping submergence depth and the total pumping lift.

For practical purposes, empirical rules have been established to determine the air volume required to pump (or air-lift) a certain volume of water. It depends on the total lift, the submergence of the air line below the water table, and the annular area. Water discharge versus percent submergence can be calculated if the air injection is known (see FIG. 5). For example, when it is desired to lift the water 10.0 m above the water table under a steady state flow condition, and the pumping submergence depth is 5.0 m, i.e., 33% of 15.0 m, then for every liter of injected air, 0.33 liter of water will be pumped (FIG. 5).

Because of the complexity of the water-bubble system, VOC mass exchange rates can only be approximated. Present estimates are based on much simpler geometries than can be obtained in reality, but calculations indicate that the method has promise because equilibrium partitioning between the contaminated liquid and the air bubbles is rapidly established. The mechanism by which the dissolved VOCs are transferred between aqueous and gaseous phases is described by a mass flux in the presence of a concentration gradient. Two possibilities have to be distinguished: equilibrium and non-equilibrium conditions. The question addressed here is: How rapidly do the rising bubbles become saturated with VOC vapor?

The distribution of volatile compounds between air and water is often expressed by Henry's law, which is a linear relationship between the equilibrium concentration of a volatile compound in the aqueous and gaseous phases. Henry's law for a system at equilibrium, based on the "ideal gas" law, is:

$$H = \frac{C_{air}}{C_{water}} = \frac{16.04 P_v M}{TS} \quad (1)$$

where H is the dimensionless Henry's coefficient, $C_{air}$ and $C_{water}$ are the mass concentrations of VOCs in the air and water phases (g/m$^3$), respectively, $P_v$ is the vapor pressure (mm Hg) measured above the pure liquid organic phase, M is the molecular weight of the solute (g/mole), T is the temperature (°K), and S is the equilibrium solubility of the solute in the water (g/m$^3$).

A first-order expression can be adopted where the force driving mass transfer is proportional to the departure from equilibrium. The proportionality constant is an overall mass transfer coefficient reflecting the contribution of geometry and the complicated structure of the interface between phases. Applying the first-order mass exchange concept to the rates of change in concentration of VOCs in the liquid and gas phases, yields:

$$-v_{water}\frac{dC_{water}}{dt} = v_{air}\frac{dC_{air}}{dt} = v_{air}K_p\left(C_{water} - \frac{C_{air}}{H}\right) \quad (2)$$

where $v_{air}$ and $v_{water}$ are the volume fractions of air and water in porous media, $K_p$ is the overall mass transfer coefficient for gas-liquid partitioning (1/sec), and t is time (sec).

The effectiveness of VOC removal in the remediation process of the present invention can be roughly estimated by applying chemical engineering analysis. For example, consider a pipe containing water and air bubbles flowing vertically in which dissolved VOCs are transferred at the water-gas interface. Such a system is illustrated in FIG. 6. For volatile substances, the mass transfer from the liquid to the gas phases is "liquid-phase-controlled". Consequently, a thin water film (boundary layer) is assumed to exist next to the air-water interface, across which a concentration gradient of VOCs is developed.

Assuming local chemical equilibrium across the water-gas interface, the VOC concentration on the liquid side of the interface is $$C_{water}^{int} = \frac{C_{air}}{H}$$

where $C_{air}$ is the VOC concentration in the gas bubble (which is assumed to be well mixed). While flowing in the pipe, the concentration of the VOCs, $C_{air}$, in the bubble increases. Based on a first-order mass transfer rate relationship, during flow along a length of pipe, the change in vapor concentration in the bubble is:

$$\frac{dC_{air}}{dX} = \frac{K_L a_b A}{Q_{air}} (C_{water} - C_{water}^{int}) = \frac{K_L a_b}{U_o} \left( C_{water} - \frac{C_{air}}{H} \right) \quad (3)$$

where:
$C_{water}^{int}$ is the mass concentration of VOCs in the water at the interface (g/m$^3$),
$K_L$ is the liquid mass transfer coefficient (m/sec),
$a_b$ is the bubble surface area per unit volume of mixture (m$^2$m$^3$),
A is the cross-sectional area of the pipe (m$^2$), $Q_{air}$ is the volumetric gas flow rate (m$^3$/sec),
x is the length (m), and $$U_o = \frac{Q_{air}}{A}$$

is the surficial air velocity (m/sec). Equation (3) assumes that the mass transfer of the dissolved VOCs is sufficiently small, so that $Q_{air}$ is nearly constant, which is quite reasonable. It is noteworthy that $K_L$ is affected by the bubble diameter.

Air entering the bottom of the pipe (FIG. 6) is free of VOCs, so $C_{air}(x=0)=0$; thus, the solution to Equation (3) is:

$$C_{air}(x) = HC^*_{water} \left[ 1 - \exp\left( \frac{K_L a_b}{H U_o} \right) x \right] \quad (4)$$

This solution assumes that during its life time, a bubble is in contact with water containing a constant concentration of VOC that is achieved at the top of the well, $C^*_{water}$. This approximation yields a conservative estimate (underestimate) of the mass exchange rate.

The key question is, what is the travel distance, $x_{sat}$, required to achieve vapor saturation (i.e., equilibrium conditions)? It can be seen from Equation (4) that the critical unknown parameter which controls the rate of vapor equilibration is $K_L$, the mass transfer coefficient. It can be estimated using a semi-empirical approach employed in chemical engineering. The mass transfer coefficient is incorporated in the dimensionless Sherwood number, sh:

$$Sh = \frac{K_L d_b}{D_L} \quad (5)$$

where: $d_b$ is the average bubble diameter (m), and $D_L$ is the diffusivity of the dissolved VOC in water (m$^2$/sec). The Sherwood number can be calculated by considering the contributions of flow conditions and molecular diffusion. The Sherwood number has been developed for different systems in chemical and biochemical engineering. The industrial air-sparged reactors, in which bubbles are produced in swarms, are most relevant to the present system. For air-lift operations where large bubbles change their shape while rising, the following correlation has been verified:

$$Sh = 0.5 Gr^{\frac{1}{3}} Sc^{\frac{1}{2}} \quad (6)$$

where Gr and Sc are the dimensionless Grashof and Schmidt numbers, characterizing flow conditions and molecular diffusion, respectively, and are:

$$Gr = \frac{d_b^3 \rho_w (\rho_w - \rho_a) g}{\mu_w^2} = \frac{d_B^3}{\nu^2} g \quad (7a)$$

$$Sc = \frac{\nu}{D_L} \quad (7b)$$

where $\rho_w$ and $\rho_a$ are the water and air mass densities (g/m$^3$), respectively, $\mu_w$ is the water viscosity (g/m/sec), and g is the gravitational acceleration (m/sec$^2$), $$\nu = \frac{\mu_w}{\rho_w}$$

is the water kinematic viscosity (m$^2$/sec). The Grashof number is the characteristic dimensionless value that describes the flow conditions (similar to the Reynolds number) for situations where the density difference (buoyancy) provides the major driving force for fluid motion.

Equations (6) and (7) were used to estimate $K_L$ in this in-situ vapor stripping system. The change in vapor saturation that occurs while water and air bubbles rise in the well was calculated for a variety of flow conditions. Consider two of the cases of bubble and slug flow patterns which correspond to FIGS. 4A and 4B. The first case involves an average bubble size of 0.64 cm. The second case involves two different types of coexisting bubbles. For that case, calculations of vapor saturation were done separately for the small bubbles in slugs of water and for the elongated bullet-shaped bubbles. The calculations below show that for water containing TCE, the vapor becomes saturated after flowing only several meters for both cases. Using Equations (4) and (6) and the values in Table 1 (below), it can be concluded that in most cases, when dealing with contaminated sites where the well casing is more than 10 meters long, the rising air bubbles can be considered as chemically saturated with TCE vapor.

For cases in which vapor saturation is not rapidly achieved the rise of bubbles may be slowed artificially. This can be done by creating a series of obstacles within the eductor pipe with the possible inclination of the well and eductor installation.

TABLE 1

TCE mass transfer calculations for bubble and slug flow patterns in a pipe:

| Parameter | Symbol | Bubble flow[1] | Slug flow[2] Small | Slug flow[2] Large | Units |
|---|---|---|---|---|---|
| Air/water volume ratio | G | 2.0 | 2.3 | | — |
| Air volume fraction | | 0.67 | 0.70 | | — |
| Water kinematic viscosity | $v$ | $10^{-6}$ | $10^{-6}$ | | $m^2/sec$ |
| TCE diffusivity in water | $D_L$ | $9.5 \times 10^{-10}$ | $9.5 \times 10^{-10}$ | | $m^2/sec$ |
| Schmidt number | Sc | 1050 | 1050 | | — |
| Average bubble diameter | $d_b$ | $6.4 \times 10^{-3}$ | $6.4 \times 10^{-3}$ | $2.3 \times 10^{-2}$ | m |
| Grashof number | Gr | $2.6 \times 10^5$ | $2.6 \times 10^5$ | $1.2 \times 10^7$ | — |
| Sherwood number | Sh | 2209 | 2209 | 7928 | — |
| Mass transfer coefficient | $K_L$ | $3.27 \times 10^{-4}$ | $3.27 \times 10^{-4}$ | $3.27 \times 10^{-4}$ | m/sec |
| Specific interfacial area | $a_b$ | 630 | 430 | 140 | $m^2/m^3$ |
| Superficial air velocity | $U_o$ | 0.15 | 0.31 | | m/sec |
| TCE Henry's Const. | H | 0.4 | 0.4 | | — |
| Fractional saturation[3] (3 m well) | S (x = 3) | 0.99 | 0.0967 | 0.67 | — |
| Fractional saturation[3] (6 m well) | S (x = 6) | 1.00 | 0.999 | 0.89 | — |
| Fractional saturation[3] (9 m well) | S (x = 9) | 1.00 | 1.000 | 0.96 | — |

[1]Corresponds to FIG. 3ASlug flow consists of two bubble types and corresponds to FIG. 3B: small bubbles inside the liquid slug and large bullet-shaped bubbles between liquid slugs.
[3]Fractional saturation is defined by:

$$S(x) = \frac{C_{air}(x)}{HC_{water}^*} = 1 - \exp\left[-\left(\frac{K_L a_b}{U_0 H}\right) x\right]$$

To determine the efficiency of the present in-situ vapor stripping method, it is necessary to calculate the time-span required to reach the Maximum Permitted Concentration (MPC) for a particular VOC in groundwater. Start by assuming that liquid-vapor transfer occurs only inside the well, and then determine the number of pore volumes that must be circulated to reduce the VOC concentration in the water to the MPC.

A single step of the remediation process is defined as the time it takes for all water in one saturated pore volume within the "influence zone" to enter that well. This influence zone can easily extend 20 m radially from the well. During this time the contaminated water equilibrates with the air bubbles inside the well. Initially, it was assumed that the contaminant does not sorb (this assumption will be relaxed later). Under steady-state flow conditions, the ratio between the water and air volumes inside the well is constant. The VOC mass balance between water and air during the n-th step is:

$$(C_{air}^n - C_{air}^{n-1})U_{air} = (C_{water}^{n-1} - C_{water}^n)U_{water} \qquad (8)$$

where C is concentration and U is volume in the well. Assuming the air injected into the well is always free of VOCs, $C_{air}^{n-1} \equiv 0$, and assuming a constant ratio of air to water volume, $G = U_{air}/U_{water}$, then:

$$C_{water}^n = C_{water}^{n-1} - G C_{air}^n \qquad (9)$$

Given chemical equilibrium, Henry's Law may be used, $C_{air}^n = H C_{water}^n$. Then:

$$C_{water}^n = \left(\frac{1}{1+GH}\right) C_{water}^{n-1} \qquad (10)$$

The VOC concentration in groundwater at the end of the p-th step can be defined as a function of the initial VOC concentration in groundwater based on a recursive series:

$$C_{water}^p = \left(\frac{1}{1+GH}\right)^p C_{water}^o \qquad (11)$$

where p is the number of steps after initiation of circulation. Defining R as the reduction ratio, such that $$R = \frac{C_{water}^{final}}{C_{water}^{initial}} = \frac{C_{water}^p}{C_{water}^o},$$

then the number of steps needed to reduce the initial concentration to the desired one can be derived by taking the log of both sides of equation (11) and rearranging, or:

$$p = \frac{-\log R}{\log(1 + GH)} \qquad (12)$$

The following examples illustrate the possible effectiveness of the in-situ vapor stripping method of the present invention. Consider a case where the groundwater temperature is 20° C. and one must reduce the concentration of TCE (H=0.4) and PCE (H=0.9) from 100 ppm to 1 ppm (R=0.01). Here we will assume that VOC concentrations are reduced only inside the well. FIGS. 7 and 8 summarize the results.

The number of circulation steps needed to reduce the concentrations of TCE and PCE dissolved in the groundwater for an in-well air/water volume ratio, G, of 2.0, is shown in FIG. 7. This represents the speed of cleanup. This ratio is representative of a "bubble flow pattern" (FIG. 4A and Table 1). The most important result is that a reduction in concentration by 2 orders of magnitude (R=0.01) will occur in about 10 flow cycles for TCE and 5 for PCE. FIG. 8 shows the number of circulation steps needed to reduce the concentration of these compounds by two orders of magnitude (R=0.01) under various air to water volume ratios in the well. Under equilibrium conditions larger G values correspond to the removal of a greater mass of VOCs than do smaller G values. This fact accounts for the reduced number of circulations steps corresponding to large G values. It can be seen that even for very low air injection rates (G=1), the number of circulation steps is less than 15 for TCE and less than 10 for PCE.

As discussed, the conceptual flow circulation system involves a central well 10 surrounded by an infiltration gallery. This gallery, called the drainage infiltration system 25 (FIGS. 1-3), consists of a series of buried pipes 32 emanating from the well to a manifold 35. As shown, deflector plate 30, or some other appropriate blocking member, directs the groundwater flow in the well into pipes 32. At the end of each pipe the water is permitted to infiltrate back to the water table 19 through a narrow infiltration zone 37. To estimate the likely groundwater circulation pattern that the air-lift and reinfiltration system would produce, some simple simulations and particle travel time analyses have been conducted. The infiltration gallery has been approximated as a donut-shaped ring around the well. That is, the infiltration gallery consists of a number of buried pipes which feed into a slotted circular ring 37. In some cases it may not be necessary to bury the pipes emanating from the well. The water rises up the well, flows away in the buried pipes and then reinfiltrates in a one-meter-wide ring surrounding the well (see FIGS. 1-3). The distance from the central well to the beginning of the infiltration zone was fixed at 4.9 meters in one simulation and 14.9 meters in another so that the influence of infiltration location on the flow circulation pattern could be seen.

Simulations were conducted assuming radial flow conditions for an isotropic homogeneous aquifer. The simulation of this system is based on the radial flow equation for steady-state conditions;

$$\frac{\partial}{\partial r}\left(2\pi r K \frac{\partial h}{\partial r}\right) + \frac{\partial}{\partial z}\left(2\pi r K \frac{\partial h}{\partial z}\right) + Q^*_{water} = 0 \quad (13)$$

where:
h is the hydraulic head h(r,z), (m);
K is the hydraulic conductivity, (m/sec);
r is the radial distance from the well, (m);
z is the vertical coordinate, (m);
$Q^*_{water}$ is the pumping rate (m/sec); and $\pi$ is 3.1416.

Equation (13) was solved using the finite difference model MODFLOW, and the particle velocities were determined using the tracking routine. The relevant parameters for the simulation model are hydraulic conductivity of $10^{-5}$ m/sec effective porosity of 0.2, pumping rate of 0.375 liters/sec., and a well radius of 0.1 m. The hydraulic head distributions in cross-section for the radial flow system given reinfiltration at two different distances away from the well are shown in FIG. 9. Also shown are the flow paths corresponding to each reinfiltration system. In both cases most of the flow recirculates within 20 meters of the well.

Under steady-state conditions, the time of transport through the unsaturated zone 24 will be directly related to the thickness of the unsaturated zone and to the flux of water coming from the well. Assuming a 10 m thick unsaturated zone beneath the drainage infiltration system and a pumping rate of 0.375 liters/sec., it may take about 10.5 and 30.0 days for the water to infiltrate to the water table, for infiltration distances of 5 m and 15 m from the well, respectively.

The travel times were computed for 100 particles released 0.25 m beneath the water table and released at distances from the well of 4.9-5.9 m (FIG. 9A) and 14.9-15.9 (FIG. 9B). The travel time is defined as the time taken for a particle to move back to the well through advection only. Travel time plots for the two release distances are shown in FIG. 10. For either infiltration distance, 95% of the particles return to the well within 7 days and most particles have a travel time of about 1 or 2 days. A single flow circulation will sweep a ring having a diameter of 40 meters around the central wall. The cylindrical space round the well that contains the water-flow paths is defined as the "influence zone" of the well during the remediation process.

The above calculation ignores the effects of sorption. However, this effect can be approximated assuming equilibrium liquid-solid partitioning. Halogenated hydrocarbons commonly are retarded by factors ranging from 2 to 9 depending upon the composition of the porous media and the specific compound. If we take a value of 3 for the retardation factor of PCE, then the travel times of individual particles shown in FIG. 10 must be multiplied by 3. In such a case a single flow circulation would take about 21 days in the saturated zone.

The infiltration system can be configured in a variety of geometries. For example: the reinfiltration zone can be on one side of the well only. Furthermore, the single well system analyzed here can be a component in a larger system consisting of many wells connected to a complex reinfiltration network.

In addition to the mass transfer that occurs in the well, VOCs will also be released during infiltration through the unsaturated zone while the pumped water is returned to the water table. The VOCs that are released there can be removed by venting the soil. The combination of the in-well mass transfer and venting of the vadose zone will give the total rate of VOC removal using this system.

In summary, a method aimed at removing VOCs dissolved in groundwater has been disclosed. The idea is to drive the VOCs from the dissolved phase into the gas phase by gas injection into a well using combined gas-lift pumping with a form of in-situ gas-stripping. The lifted water, free of a portion of VOCs, infiltrates through the vadose zone back to the water table. As water circulates through the in-situ treatment system, the VOC concentrations are gradually reduced. The VOCs that are released into the gaseous phase in both the well and the vadose zone can be removed at the top of the well and through forced air ventilation. This technique is very simple and would avoid pump-and-treat restoration. It would reduce above-ground treatment. Using this system, it is not necessary to bring the contaminated water to the ground surface.

The feasibility of this method was shown through mass transfer calculations and flow simulations. Mass-transfer calculations considered equilibrium and non-equilibrium effects. Calculations indicate it is likely that vapor saturation occurs within air bubbles when they reach the top of the well. The flow simulations assume a homogeneous and isotropic medium, without sources and sinks (e.g., entrapped NAPL ganglia and unequilibrated soil adsorption, respectively.) In field cases more complex factors have to be considered.

Modifications of the proposed system can improve its efficiency. For example, problems of oxidation, chemical precipitation and biofouling may be overcome by recirculating the gas after VOCs are removed. In addition, the in-situ vapor stripping method can be applied when removing dissolved VOCs, or when the organic liquid occurred in a separate phase as a floating substance or a submerged one.

Usually a contaminated aquifer is much larger than the influence zone of a single well. For practical purposes, several wells may be needed. The optimum design of the well field and its optimal operation conditions have to be determined separately for any remediation site according to its characteristics. The relevant parameters for such a design will be the aquifer characteristics (thicknesses of the saturated and unsaturated zones, the regional flow regime, and horizontal and vertical permeabilities), the remediation requirements (final permitted VOC concentrations and required time frame for cleanup), and the well characteristics (screened interval and rate of air injection).

FIG. 11 illustrates an embodiment for VOC vapor extraction including a well 50 comprising an inner well 52 and an outer well 54. The inner well 52 extends from ground surface 22 to beneath water table 19 (perhaps to the bottom of the aquifer). The inner well 52 may extend above, below or directly (as shown) into the zone or area of contamination 55 including VOCs.

The inner well 52 may be screened partially by a well-screen casing 56 in the saturated zone 15 to allow contaminated water, including VOCs, to flow into the inner well. The inner well may be cased elsewhere by a solid casing 57. As discussed above, a gas injection line 16 extends from the ground surface through the inner well and into the saturated zone. The rate of gas injection is adjustable to create substantial contaminated groundwater circulation, represented by arrows A, toward and up the inner well. The rate of in situ volatilization of VOCs may be controlled by adjusting the rate of the gas injection. A water-air bubble mixture 20 flows upwardly in the inner well in annular space 21 formed between line 16 and the walls of inner well 52.

As shown, outer well 54 has a larger diameter than that of the inner well, and extends from ground surface 22 to a location above water table level 19. As such, the outer well may extend only through the vadose zone 24. The walls of the casing forming outer well 54 are coaxially spaced from the walls of inner well 52, defining an annular space 58 between the walls of the outer and inner wells.

As illustrated, the upper end 54a of the inner well 52 may terminate within outer well 54. The outer well may be constructed so it is sealed to the atmosphere except for the openings provided for gas injection line 16 and vapor extraction line 33. The lower end 54b of the outer well is opened to allow air-lifted groundwater to be reinfiltrated to the saturated zone. Alternatively, the lower end 54b of the outer well may be screened by a well screen to provide apertures or passageways to allow reinfiltration. The flow of groundwater from the outer well is represented generally by solid arrows B.

A blocking member 60 is disposed in the inner well between water table 19 and ground surface 22. A portion of the well casing of inner well 52 is screened by screen casing 59 along a portion of the well located beneath blocking member 60. Screen casing 59 allows VOC vapor and contaminated groundwater to exit the inner well after striking blocking member 60. The blocking member is an impermeable barrier to the flow of groundwater and gas bubbles. It may comprise, for example, a well plug, a seal, a separator plate, a deflector plate, or a gravel pack.

A barrier 62 which is permeable to the flow of VOC vapor is formed in annular space 58. The impermeable barrier 60 may be, for example, a separator plate or deflector plate. The impermeable barrier 60 and may be constructed as a blocking member, as appropriate for the particular well design.

The outer well effectively forms a vapor collection cylinder to prevent VOC vapor from being released into unsaturated zone 24, and to permit VOC vapor released from the inner well to be collected and extracted from well 50 via extraction line 33. At some distance above blocking member 60, the walls of outer well 54 may be screened in region 64 so that any VOC vapor in the unsaturated zone may be drawn into the outer well for removal. The walls of the inner and outer wells that are not screened may be cased by a solid casing, as shown.

As discussed, gas under pressure is injected into the inner well to force groundwater flow towards the inner well and to cause water to be lifted up the inner well (arrows A), creating a recirculating clean-up zone. During this process, VOCs are transferred from the contaminated groundwater to the rising bubbles 20 inside the inner well. In other words, water and bubbles rise up the inner well, and water inside the aquifer flows towards the inner well. During the period in which the bubbles flow through the water in inner well, VOCs are transferred from the contaminated groundwater to the rising bubbles inside the inner well.

The contaminated groundwater and gas bubbles including VOCs rise up the inner well until they strike blocking member 60. The groundwater, upon striking blocking member 60, is forced out of the inner well through the passageway provided in the wall of the inner well by, for example, screen casing 59. After exiting the inner well, the groundwater, as represented by arrows B, flows out of the annular space between the inner and outer wells. From that point, as discussed above, the groundwater, free of a portion of VOCs, infiltrates back to the saturated zone 15, establishing a water circulation cell in the vicinity of well 50.

Upon striking deflection member 60, the gas bubbles, including VOC vapor, are "popped" causing the VOC vapor to be released from the gas bubbles. The VOC vapor exits the inner well via the openings formed by screen casing 59. Then by means of the ventilator 36, the VOC vapor, represented by arrows C, is extracted through permeable member 62 into annular space 58 formed between the walls of the inner and outer wells. From that space, the VOC vapor is collected, as discussed, using any appropriate vapor extraction technique.

FIG. 12 illustrates an embodiment of the present invention including a well extraction member extending toward a zone or area of contamination. As shown, and described above, well 50 has a vertical section which extends from ground surface 22 to beneath water table 19 (perhaps to the bottom of the aquifer). At some depth within saturated zone 15 (depth of contamination), the well includes an extraction member, component or channel 70 which extends toward the zone or area of contamination 55. The extraction member may extend above, below or directly (as shown) into the contaminated zone. As shown, the extraction member may be a substantially horizontal channel extending into the zone of contamination. The extraction member may also be inclined from the horizontal, towards or away from surface 22, to extend toward the contamination zone. In the saturated zone, the extraction member 70 is screened by a well screen casing 72 only at or near the zone of contamination 55.

Gas injection line 16 may extend into the extraction member 70. As discussed, gas is injected under pressure, creating bubbles. The bubble and water column 20 is lighter than the aquifer water, thereby creating an upward flow of water within the well (arrows A). Contaminated groundwater in the saturated zone (represented by solid arrows D) enters extraction member 70 in the screened interval 72. This water migrates along the extraction member and then up the vertical section of the well (arrows A). As discussed, the contaminated groundwater and bubbles rise up the inner well until they strike blocking member 60.

FIG. 13 illustrates another embodiment of the present invention. This embodiment includes an infiltration member 74 protruding into the unsaturated zone 24 from vertical section 51b of well 51a. The infiltration member is screened by well screen casing 75a to allow water (represented by solid arrows E) to infiltrate back to the water table. Infiltration member 74 may extend substantially horizontally from well 51a. The member 74 also allows popped bubbles of VOC-rich vapor (represented by the outlined arrows F) to escape into the unsaturated zone via screen casing 75b. Above the horizontal infiltration member 74, in the unsaturated zone, there is a packer, seal, or deflection plate 76 forming a blocking member. The packer may simply be an inflatable well seal, and the seal may be formed by impermeable plate. At some distance above blocking member 76, the well is screened by screened casing 78 in the unsaturated zone, so that the VOC vapor emitted from the circulating groundwater (popped bubbles) can be collected and treated (arrows C). The well components that are not screened are cased by a solid casing.

Upon rising to the point just above the infiltration member 74, the bubble and water column strikes blocking member 76 and is directed into the infiltration member. There, the water is directed into the unsaturated zone 24 (arrows E) to infiltrate back to saturated zone 15. The location at which infiltration occurs is controlled by the location of the screened interval 75a in infiltration member 74. The presence of the reinfiltrated water creates a groundwater mound and the groundwater flows down the hydraulic gradient, i.e., cone of depression, (solid arrow G) toward screened section 72 of extraction member 70.

The gas bubbles pop as they rise to the top of infiltration member 74. They are extracted through screened casing 78 above blocking member 76. The top of the well is sealed and vapor line 33 extends into the well to extract the VOC vapor. As in the above-discussed embodiments, ventilator 36 may be connected across vapor extraction line 33 to allow for vapor extraction. The VOC vapor may then be treated by an appropriate vapor treatment system 29.

In the embodiment of FIG. 14, infiltration member 74 does not comprise a horizontal, or for that matter an inclined, extension of the well. Rather, infiltration is accomplished by providing a screen well casing 80 between blocking member 76 and water table level 19. As with infiltration member 74, the screen casing 80 provides suitable passages or openings for the escape of VOC vapor (arrows F) and water (arrows E) into the unsaturated zone.

As in the above-discussed embodiments, water exiting the well via screen casing 80 infiltrates back to saturated zone 15, and VOC vapor from popped bubbles may be removed through the upper portion of the well via the apertures formed by screened casing 78 and the vapor extraction equipment.

Additionally, this embodiment includes an injection line 82 for injecting substances, such as surfactants, nutrients or catalysts, into the zone of contamination. Such substances are used to directly or indirectly aid the remediation process. As shown, injection line 82 may extend into the well and terminate at a point above extraction member 70.

Only one well, extraction member and infiltration member have been shown. Depending upon the size of the area of contamination, for example, the system could employ a plurality of wells using more than one extraction member and infiltration member.

The embodiments of FIGS. 12-14 offer certain benefits as discussed below. First, there is no need for a shallow infiltration gallery which requires excavation from the ground surface to install. Second, there is no need for a system of slots and baffles to keep the air out of the saturated zone upon air injection because the air is not injected anywhere near the screened interval in the saturated zone. Third, these embodiments generate an extremely large circulation cell. The size of the circulation cell is controlled by the distance between the extraction member in the saturated zone and the point at which groundwater is reintroduced into the unsaturated zone. There are no short circuits, i.e., no very short flow paths for recirculating water to follow. Fourth, air-lift pumping costs will be modest because the water does not need to rise very high above the water table before it is reinfiltrated. There is no need to take water to the elevation just below the root zone. The lifts are greatly reduced. Fifth, the contaminant can be easily removed by careful placement of the extraction and infiltration intervals. The size of the system can be easily controlled by the distance between these intervals and the degree of air-lift pumping. Sixth, the system can be designed to enhance flushing of the groundwater by placing the infiltration portion of the well on the high side of the natural groundwater gradient and the water extraction member on the low side of the natural groundwater gradient. The groundwater circulation will then be a function of both the natural-gradient and the induced circulation due to pumping. Finally, in the embodiment of FIGS. 13 and 14, the vertical portion of the well is of uniform diameter both above and below the blocking member. This reduces the overall cost of the well.

It should be understood that in the above discussed embodiments the vapor extraction system may be unnecessary if VOC vapor may be treated in situ. For example, the vapor extraction step may be eliminated if the VOC vapor in the unsaturated zone can be treated biologically using enhanced bioventing wherein the groundwater contaminants are transferred to the unsaturated zone as a vapor where they are degraded. Other forms of in situ remediation are also possible in the unsaturated zone. This is particularly true for remediation of petroleum and petroleum byproducts.

Although embodiments of the invention have been described in detail, the invention is not to be limited to such embodiments, but rather by the appended claims.

What is claimed is:

1. A system for removing volatile organic compounds (VOCs) from groundwater, comprising:
   means for injecting a gas into a well to cause groundwater to flow towards and up the well, and to cause VOCs to be transferred from the groundwater to rising gas bubbles in the well;
   means in the well for separating VOC vapor from the rising gas bubbles and water mixture in the well;
   means for treating the VOC vapor after separation; and
   means for directing the groundwater from the well towards a saturated zone to establish a circulation path extending through the well and the saturated zone for the removal of VOCs.

2. The system of claim 1 further including a substantially horizontal extraction member extending from the well in the saturated zone toward an area of contaminated groundwater for the introduction of contaminated groundwater into the well.

3. The system of claim 2 wherein said extraction member includes openings formed therein for allowing groundwater flow into the well.

4. The system of claim 3 wherein said openings are formed by a well screen along a portion of said extraction member.

5. The system of claim 1 wherein said directing means includes a substantially horizontal infiltration member extending from the well in an unsaturated zone, and a blocking member disposed in the well above said infiltration member for directing groundwater and gas bubble flow into said infiltration member.

6. The system of claim 1 wherein said directing means includes infiltration openings in the well in an unsaturated zone, and a blocking member in the well above said openings for directing groundwater and gas bubble flow in the well through said infiltration openings.

7. The system of claim 1 wherein said treating means includes in situ degradation.

8. A system for removing volatile organic compounds (VOCs) from groundwater, comprising:
   means for injecting a gas into a well to cause groundwater to flow towards and up the well, and to cause VOCs to be transferred from the groundwater to rising gas bubbles in the well;
   means in the well for separating VOC vapor from the rising gas bubbles and water mixture in the well;
   extraction means at the top of the well for collecting the VOC vapor after separation; and
   means for directing the groundwater from the well towards a saturated zone to establish a circulation path extending through the well and the saturated zone for the removal of VOCs.

9. The system of claim 8 further including a well screen along a portion of the well in the saturated zone for allowing groundwater flow into the well.

10. The system of claim 9 wherein a well screen extends along the portion of the well in a vadose zone.

11. The system of claim 8 further including means for exhausting, treating or destroying the VOC vapor.

12. The system of claim 8 wherein said gas injection means includes: a gas line extending into the well; and a compressor means for injecting gas into said well via said gas line.

13. The system of claim 8 wherein the well includes an inner well extending into the saturated zone and an outer well extending into a vadose zone wherein said outer well is coaxially spaced from said inner well along a portion thereof extending through the vadose zone to define an annular space therebetween.

14. The system of claim 13 wherein the outer well forms a vapor collection cylinder.

15. The system of claim 13 wherein said inner well directs groundwater and gas bubbles to the separation means.

16. The system of claim 15 further including means along a portion of the inner well in the saturated zone to allow groundwater to enter the well and means along a portion of the inner well in the vadose zone to allow groundwater to exit the inner well.

17. The system of claim 16 further including a well screen means along a portion of the outer well in the vadose zone.

18. The system of claim 16 further including means for venting VOC vapor from the vadose zone into the annular space between the outer and inner wells.

19. A system for removing volatile organic compounds (VOCs) from groundwater, comprising:
   a first well means extending from the ground surface into a saturated zone;
   a second well means extending from the ground surface into a vadose zone, said second well means coaxially spaced from said first well means along a length thereof to define an annular space between walls of said first and second wells means;
   means for injecting a gas into said first well means to cause groundwater to flow towards and up the first well means but not to the ground surface, and to cause VOCs to be transferred from the groundwater to a vapor within rising gas bubbles in said first well means;
   separation means for separating the VOC vapor from the gas bubbles, for allowing the VOC vapor to enter said second well means, and for directing the flow of groundwater from said first well means towards the saturated zone to establish a circulation path extending through the well, the vadose zone and the saturated zone for the removal of VOCs; and
   means for collecting the VOC vapor from said second well means.

20. The system of claim 19 further including first aperture means along a portion of said first well means in the saturated zone to allow groundwater to enter said first well means and second aperture means along a portion of said first well means in the vadose zone to allow groundwater and VOC vapor to exit said first well means.

21. The system of claim 20 further including third aperture means along a portion of said second well means to allow VOC vapor to enter said second well means.

22. The system of claim 20 wherein said separation means includes a blocking member disposed in a portion of said first well means in the vadose zone, said blocking member including an impermeable portion.

23. The system of claim 22 wherein said separation means further includes a passage in said second well means to allow VOC vapor to enter the annular space between said first and second well means.

24. A system for removing volatile organic compounds (VOCs) from contaminated groundwater, comprising:
   a well having a substantially vertical portion extending through an unsaturated zone into a saturated zone;

a substantially horizontal extraction member extending from the vertical portion of the well in the saturated zone toward an area of contaminated groundwater for the introduction of contaminated groundwater into the well;

means for injecting a gas into the well to cause groundwater to flow into said extraction member and up the well, and to cause VOCs to be transferred from the groundwater to rising gas bubbles in the well;

means for directing groundwater flow from the well into the unsaturated zone to infiltrate groundwater therethrough and for releasing VOC vapor from the well into the unsaturated zone, and to establish a circulation path extending through the well, the unsaturated zone and the saturated zone for the removal of VOCs; and means for collecting VOC vapor released into the unsaturated zone.

25. The system of claim 24 wherein said directing and releasing means includes a substantially horizontal infiltration member extending from the vertical portion of the well in the unsaturated zone, and a blocking member in the well above said infiltration member for directing groundwater and gas bubble flow in the well into said infiltration member.

26. The system of claim 24 wherein said directing and releasing means includes infiltration openings in the well in the unsaturated zone, and a blocking member in the well above said infiltration openings for directing groundwater and gas bubble flow in the well through said infiltration openings.

27. The system of claim 25 or 26 wherein said collection means includes passages in the well above the blocking member for the passage of VOC vapor into the well; and vapor extraction means for removing VOC vapor from the well.

28. A system for removing volatile organic compounds (VOCs) from groundwater, comprising:
a first well means extending from the ground surface into a saturated zone;
a second well means extending from the ground surface into a vadose zone, said second well means coaxially spaced from said first well means along a length thereof to define an annular space between walls of said first and second wells means in the vadose zone;
a substantially horizontal extraction member extending from said first well means in the saturated zone toward an area of contaminated groundwater for the introduction of contaminated groundwater into said first well means;
means for injecting a gas into said first well means to cause groundwater to flow towards and up the first well means, and to cause VOCs to be transferred from the groundwater to a vapor within rising gas bubbles in said first well means;
separation means for separating the VOC vapor from the gas bubbles, for allowing the VOC vapor to enter said second well means, and for directing the flow of groundwater from said first well means towards the saturated zone to establish a circulation path extending through the well, the vadose zone and the saturated zone for the removal of VOCs; and
means for collecting the VOC vapor from said second well means.

29. The system of claim 28 wherein said separation means includes a blocking member disposed in a portion of said first well means in the vadose zone, said blocking member including an impermeable portion.

30. A method for removing volatile organic compounds (VOCs) from groundwater, comprising:
injecting a gas into a well extending into a saturated zone to force groundwater flow towards and up the well, and to cause VOCs to be transferred from the groundwater to rising gas bubbles inside the well;
separating the VOC vapor from the rising gas bubbles and water mixture;
treating the VOC vapor; and
directing groundwater flow in the well towards the saturated zone to return the groundwater thereto to establish a circulation path extending through the well and the saturated zone for the removal of VOCs.

31. The method of claim 30 wherein said treating step includes in situ degradation.

32. A method of removing volatile organic compounds (VOCs) from the groundwater, comprising:
(a) injecting gas into a well to cause groundwater to flow towards the well and to cause VOCs to be transferred from the groundwater to rising gas bubbles in the well;
(b) separating the gas bubbles including VOC vapor from the groundwater rising in the well;
(c) after separation from the groundwater, treating, exhausting or destroying the VOC vapor; and
(d) directing the groundwater into an unsaturated zone to infiltrate the groundwater therethrough to establish a circulation path extending through the well and the unsaturated zone for the removal of VOCs.

33. A method for removing volatile organic compounds (VOCs) from groundwater, comprising:
injecting a gas into a well extending into a saturated zone to force groundwater flow towards and up the well, and to cause VOCs to be transferred from the groundwater to rising gas bubbles inside the well;
separating the VOC vapor from the rising gas bubbles and water mixture;
collecting VOC vapor; and
directing groundwater flow in the well towards the saturated zone to return the groundwater thereto and to establish a circulation path extending through the well and the saturated zone for the removal of VOCs.

34. A method of removing volatile organic compounds (VOCs) from groundwater, comprising:
(a) injecting gas into a well to cause groundwater to flow towards the well and to cause VOCs to be transferred from the groundwater to rising gas bubbles in the well;
(b) separating VOC vapor from the groundwater rising in the well;
(c) after the step of separating, collecting and extracting from the well VOC vapor; and
(d) directing the groundwater rising in the well into a vadose zone to infiltrate the groundwater therethrough and to establish a circulation path extending through the well and the vadose zone for the removal of VOCs.

35. The method of claim 34 further including venting VOC vapor from the vadose zone.

36. A method of removing volatile organic compounds (VOCs) from groundwater, comprising:
 (a) injecting gas into a well to cause groundwater to flow towards the well and to cause VOCs to be transferred from the groundwater to rising gas bubbles in the well;
 (b) separating the gas bubbles including VOC vapor from the groundwater rising in the well;
 (c) after separation from the groundwater, collecting the VOC vapor;
 (d) directing the groundwater into a vadose zone to establish a circulation path extending through the well and the vadose zone for the removal of VOCs; and
 (e) treating, exhausting or destroying the VOC vapor.

37. A method for removing volatile organic compounds (VOCs) from groundwater wherein a well extends through an unsaturated zone into a saturated zone, comprising:
 extending a substantially horizontal extraction member from the well in the saturated zone toward an area of contaminated groundwater for the introduction of contaminated groundwater into the well;
 injecting a gas into the well to cause groundwater to flow into said extraction member and up the well, and to cause VOCs to be transferred from the groundwater to gas bubbles inside the well; and
 directing groundwater flow in the well into the unsaturated zone to return the groundwater thereto to establish a circulation path extending through the well, the unsaturated zone and the saturated zone for the removal of VOCs, and to transfer VOC vapor from the well to the unsaturated zone.

38. The method of claim 37 further including collecting VOC vapor from the unsaturated zone.

* * * * *